(12) United States Patent
Nativ

(10) Patent No.: US 12,552,418 B2
(45) Date of Patent: Feb. 17, 2026

(54) NARROW WIDTH PERSONAL TRANSPORTATION SYSTEM

(71) Applicant: NETIVONIM LTD, Migdal Haemeq (IL)

(72) Inventor: Yechiel Nativ, Migdal HaEmek (IL)

(73) Assignee: NETIVONIM LTD, Migdal Haemeq (IL)

( * ) Notice: Subject to any disclaimer, the term of this patent is extended or adjusted under 35 U.S.C. 154(b) by 615 days.

(21) Appl. No.: 18/001,545

(22) PCT Filed: Jun. 17, 2021

(86) PCT No.: PCT/IL2021/050736
§ 371 (c)(1),
(2) Date: Dec. 12, 2022

(87) PCT Pub. No.: WO2021/260680
PCT Pub. Date: Dec. 30, 2021

(65) Prior Publication Data
US 2023/0202533 A1    Jun. 29, 2023

Related U.S. Application Data

(60) Provisional application No. 63/148,158, filed on Feb. 11, 2021.

(30) Foreign Application Priority Data

Jun. 22, 2020   (IL) .......................................... 275587

(51) Int. Cl.
*B61B 13/06*    (2006.01)
*B61B 13/00*    (2006.01)
(Continued)

(52) U.S. Cl.
CPC .............. *B61B 13/06* (2013.01); *B61B 13/00* (2013.01); *B61B 13/04* (2013.01); *B61D 15/00* (2013.01);
(Continued)

(58) Field of Classification Search
CPC ......... B61B 13/04; B61B 13/06; B61B 13/00; E01B 25/28; E01B 25/08; E01C 1/02; B61D 15/00; B61L 2210/02
See application file for complete search history.

(56) References Cited

U.S. PATENT DOCUMENTS 3,618,531 A    11/1971  Eichholz
3,791,308 A    2/1974   Hartz
(Continued)

FOREIGN PATENT DOCUMENTS

CN    108001971 A  *  5/2018    ....... H01L 21/67709
CN    208762797 U  *  4/2019    ............. E01B 37/00
(Continued)

OTHER PUBLICATIONS

International Preliminary Report on Patentability issued Aug. 30, 2022 in connection with PCT International Application No. PCT/IL2021/050736.
(Continued)

*Primary Examiner* — Cheng Lin
(74) *Attorney, Agent, or Firm* — Meitar Patents Ltd.; Daniel Kligler

(57) ABSTRACT

Personal transportation system includes plurality of personal transportation vehicles (PTVs) driven on a track network with series of track sections. PTV main section has lateral width adapted to contain single occupant. PTV driving mechanism propels PTV and includes track engaging element protruding downwards from main section and having narrow lateral width such that main section is prone to fall
(Continued)

over when PTV is at rest. The space between lateral width of main section and track engaging element can be occupied by public infrastructure. Each track section includes a ground portion, minimally adapted to accommodate track engaging element lateral width, and an empty space above ground portion, free of non-transient obstacles and minimally adapted to accommodate main section lateral width. A guidance mechanism guides PTV along track network and prevents PTV deviating from track sections. A stabilization mechanism stabilizes PTV along track network and prevents PTV from falling over when turning/merging/diverging.

18 Claims, 14 Drawing Sheets

(51) Int. Cl.
  *B61B 13/04* (2006.01)
  *B61D 15/00* (2006.01)
  *E01B 25/08* (2006.01)
  *E01B 25/28* (2006.01)
  *E01C 1/02* (2006.01)
(52) U.S. Cl.
  CPC .............. *E01B 25/08* (2013.01); *E01B 25/28* (2013.01); *E01C 1/02* (2013.01); *B61L 2210/02* (2013.01)

(56) References Cited

U.S. PATENT DOCUMENTS

| | | | |
|---|---|---|---|
| 4,089,270 A | | 5/1978 | Blake |
| 4,237,790 A | | 12/1980 | DeLucia |
| 4,671,185 A | * | 6/1987 | Anderson ............... E01B 25/28 |
| | | | 104/130.07 |
| 5,277,124 A | * | 1/1994 | DiFonso ................. E01B 25/28 |
| | | | 246/433 |
| 5,845,581 A | * | 12/1998 | Svensson ............... E01B 25/28 |
| | | | 104/243 |
| 5,960,717 A | * | 10/1999 | Andre ....................... B60L 5/40 |
| | | | 191/25 |
| 6,308,636 B1 | * | 10/2001 | Collins ................... B61B 13/04 |
| | | | 104/243 |
| 9,085,305 B2 | * | 7/2015 | Pumpelly ................ B61C 13/00 |
| 2001/0037747 A1 | * | 11/2001 | Svensson ............... B60L 13/06 |
| | | | 104/243 |
| 2003/0140817 A1 | * | 7/2003 | Novacek ................. B61B 13/04 |
| | | | 104/137 |
| 2009/0320713 A1 | | 12/2009 | Amiri |

FOREIGN PATENT DOCUMENTS

| | | |
|---|---|---|
| GB | 1529060 A | 10/1978 |
| WO | 9535221 A1 | 12/1995 |
| WO | WO-2016038621 A1 * 3/2016 ............. B61B 13/00 |

OTHER PUBLICATIONS

Written Opinion of the International Searching Authority issued Oct. 7, 2021 in connection with PCT International Application No. PCT/IL2021/050736.

Extended European Search Report appl. 21830257.8 dated Jul. 8, 2024.

* cited by examiner

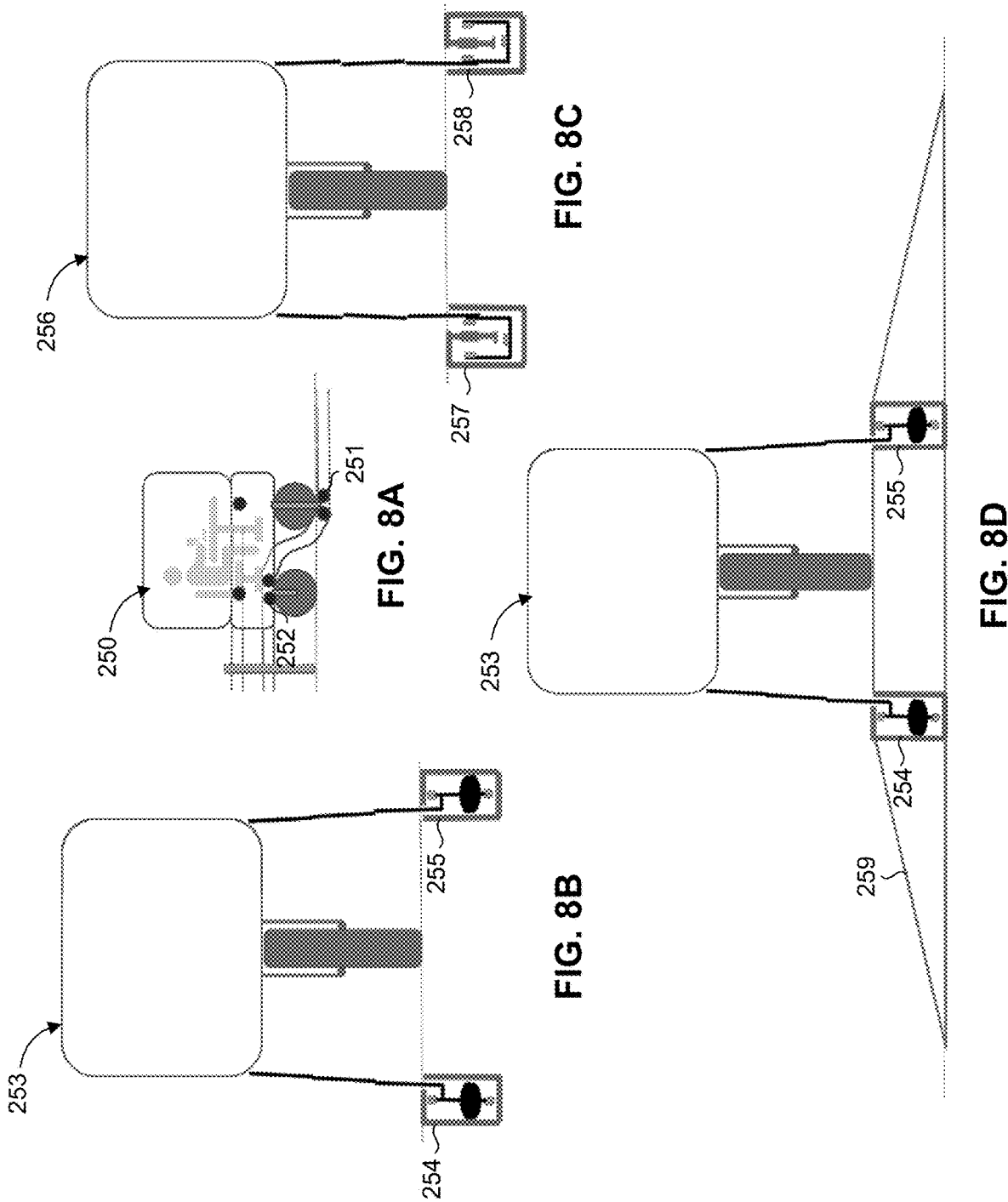

NARROW WIDTH PERSONAL TRANSPORTATION SYSTEM

CROSS-REFERENCE TO RELATED APPLICATIONS

This application is a § 371 national stage of PCT International Application No. PCT/IL2021/050736, filed Jun. 17, 2021, claiming of U.S. Provisional priority Application No. 63/148,158, filed Feb. 11, 2021 and Israeli Patent Application No. 275587, filed Jun. 22, 2020, the entire contents of each of which are hereby incorporated by reference into the subject application.

FIELD OF THE INVENTION

The present invention relates to the field of transportation in general, and to an autonomous personal transportation integrated with existing public transportation infrastructure, in particular.

BACKGROUND OF THE INVENTION

A fundamental requirement of modern society is an ability to provide efficient and safe transportation of people and freight to designated destinations. Existing transportation mechanisms have several drawbacks. Private automobiles and other personal vehicles occupy a significant amount of space on public roads, resulting in road congestion and traffic jams (along with wasted fuel and time and substantial economic costs), as well as increased environmental pollution. Private vehicles also require space for parking or idling when not in use, consuming valuable land resources. Vehicles adapted for transporting multiple passengers and freight, such as buses, vans or taxis, are often inefficient in that they generally require passing through multiple stops or stations for collecting or discharging passengers, which significantly extends the overall duration of a trip. Moreover, the passenger (and/or freight) is required to arrive at the designated pick-up point from his/her initial location, as well as to travel from the designated drop-off point to his/her intended destination, which adds further time and inconvenience to the trip. Many times, particularly in congested locations such as inner cities, even public multi-passenger vehicles find themselves trapped in congested traffic along with private vehicles, and occupy a significant amount of wasteful road space, especially at the beginning and end of the journeys during which the vehicles tend to be relatively empty.

Trains, subways, and other forms of rail transport, which operate on dedicated lanes separated from public roads, may help alleviate road congestion and provide relatively quick transportation for a large number of passengers and/or other freight. However, rail transport necessitates a significant investment in supporting infrastructure, including railway tracks, bridges and tunnels, and rail stations, which is expensive, time consuming and also occupies valuable real estate. Rail transport is also characterized by additional constraints, such as relatively few stations along a given track route where passengers must reach in order to embark and disembark, as well as fixed arrival and departure times to which passengers must adapt their schedule.

Another type of public transport system is personal rapid transit (PRT), in which a series of small automated vehicles are guided along a network of dedicated tracks or guideways, generally situated above ground in urban locations. Several PRT systems have been designed and implemented in practice, such as Morgantown PRT and Skycube. However, the dedicated guideways require a substantial investment in planning and infrastructure. In addition, there a generally a small number of PRT stations, such that PRT systems are suited primarily for situations requiring quick transport between a few stations within a limited area, such as a university campus or an airport terminal (e.g., Heathrow PRT).

To provide additional flexibility in rail or track based transport systems, whether underground or aboveground systems, a number of solutions and approaches have been suggested for transferring the vehicles between rail tracks, including diverging and merging techniques. These solutions generally do not provide sufficient flexibility or operate quickly enough to accommodate a large number of small discrete railcars. Examples of such solutions are disclosed in: U.S. Pat. No. 6,389,982 to Evensen, entitled: "Transport system"; U.S. Pat. No. 7,624,685 to Andreasson et al, entitled: "Guideway and chassis system for wheel based rail running vehicle"; U.S. Pat. No. 7,966,943 to Brigham, entitled: "Mass transit vehicle system"; U.S. Pat. No. 8,950,337 to Davis, entitled: "Personal transportation rail system"; and U.S. Patent Application Publication No. 2011/0196561 to Jorgensen, entitled: "Patent for a personal transportation network-PTN". However, these approaches require expensive aboveground infrastructure and/or must reduce the danger of overturning due to a configuration having sufficient width and weight, and are thus not suitable for small personal railcars.

Smaller sized personal transportation vehicles, such as motorcycles, mopeds, bicycles, and scooters, are by and large tremendously unsafe, for both the driver and others in the vicinity. They are prone to accidents, are easily upended or overturned, move quickly and unexpectedly through traffic and are thus susceptible to collisions with other drivers as well as pedestrians. Moreover, small personal vehicles are generally only suitable for use during certain weather conditions (e.g., clear visibility and low precipitation), by only certain types of users (e.g., typically younger individuals), and only in certain areas (e.g., urban environments with proper supporting infrastructure). Small personal vehicles can also be public nuisances when parked or idled in an improper or reckless manner.

There are also smaller automobiles, such as subcompact or mini-compact motor vehicles, which are designed for one or two occupants at most. These vehicles consume less space when parking or idling, but still travel along regular driving roads and lanes and thus do very little to alleviate road congestion.

A significant downside of motor vehicles is the amount of air pollution and noise pollution that they emit. This is applicable to both private vehicles, such as cars and trucks, as well as public transport vehicles, such as buses and trains. Recent years has seen the increased development and market availability of electric vehicles (EVs), which are propelled using electric motors and thus have reduced emissions of pollutants relative to conventional diesel-powered motor vehicles. However, considerable challenges remain to be addressed with electric vehicles, such as increasing efficiency and reducing costs, the need to regularly travel to battery charging stations and/or to install residential recharging infrastructure, and the indirect pollution associated with electricity generation and battery disposal.

Another fairly recent development has been the increased interest in autonomous vehicles (AVs) or "self-driving cars", capable of operating without human involvement, and the substantial resources dedicated by various companies to advancing the technology. These autonomous vehicles embedded with complex sensors and control systems are intended to enhance transportation efficiency by minimizing traffic accidents predominantly arising from human error and freeing up personal time for non-driving tasks during travel. However, there remain considerable challenges with integrating autonomous vehicles into existing transportation infrastructure in a safe and reliable manner. While the proliferation of autonomous vehicles will likely help alleviate parking issues, it will probably not address the problem of traffic and road congestion, and might even exacerbate congestion if personal (e.g., single occupant) usage of autonomous vehicles predominates over public transport options. AVs are also susceptible to security threats such as cyberattacks which have the potential for colossal damages and harmful repercussions.

Several alternative transit approaches have also been proposed, but they tend to lack flexibility and cannot be applied to different road conditions or terrain types, or have relatively large space requirements and occupy substantial sections of public roads or sidewalks, particularly at turns or intersections. The infrastructure required is complex and needs high precision and time investment, similar to railway construction. There are difficulties managing problematic locations such as pedestrian crossings and intersections occupied by additional conventional transport vehicles. Safety limitations is also an issue, particularly at intersections, pedestrian crossings, bus stops, and obstacles entering the dedicated transport lane.

U.S. Pat. No. 7,302,319 to Wu, entitled: "Personal transportation system", is directed to an automated personal transportation system for moving passengers and light cargo. A small size vehicle or autocar is used on a railway-like track network, which includes a pair of side rails and a central rail. The side rails engage rigid wheels of the vehicle to support the vehicle, and the central rail engages guiding wheels of the vehicle to center the vehicle on the track and to reduce noises associated with lateral vibration of the vehicle. The vehicle width is limited to a dimension for one seat. The vehicles can be statically and dynamically coupled to form a train. A plurality of stops and stations are provided for loading and unloading at side tracks off the mainline of the track network. A central control system is responsible for functions related to the whole system, such as vehicle registration, user registration and traffic control. A wayside control system is responsible for controlling operations relating to stations and stops, diverging and merging. A vehicle control system is responsible for controlling operations relating to vehicle operations, such as speed, braking, coupling and decoupling procedures, and collision avoidance.

U.S. Patent Application Publication No. 2009/0320713 to Amiri, entitled: "People and cargo transit systems and vehicles", is directed to a transit system, which includes a number of lanes or tracks along roads, and vehicles running within the lanes. The vehicles may be narrow vehicles which is single seat wide. The lanes may be dedicated narrow lanes adjacent to the curbside of existing intra-city streets or limits of intra-city roads. The vehicles and lanes include anti-roll over means for stabilizing the vehicles and eliminating swaying. The anti-roll over means may be embodied by claws or hooks attached to the vehicles that slidingly grab a rail stretched along the lane, or magnets gliding above a steel strip laid along the lane surface, or walls on at least one side of the vehicle and along the lanes. The lanes also include structures to allow and withstand being crossed over by vehicles, where the crossing vehicles run over some of the structures, as opposed to flying over them, at a number of crossroads, traffic entrances and exits along the lane.

U.S. Pat. No. 4,671,185 to Anderson et al, entitled: "Switch mechanism", is directed to a vehicle mounted switch mechanism for use in a transportation system having a wheeled vehicle supported by a fixed guideway. The vehicle includes a bogie located beneath a body portion. The bogie includes a main frame and wheels for rolling the vehicle along the guideway. The switching mechanism has a first elongated upper switch arm attached in a pivoting relationship near the midpoint of the first arm to the main frame of the bogie. The upper switch arm includes first and second switch wheels affixed at the ends of the arm, the switch wheels having intersecting axes of rotation. The upper switch arm is switchable between a first position and a second position. The first position places the first switch wheel in engaging relationship with the first switch channel located within the guideway, the second switch wheel located distant from the second switch channel. The second position places the second switch wheel in engaging relation with the second switch channel and placing the first switch wheel distant from the first switch channel. The first and second positions of the upper switch arms cause the vehicle to select a desired path, left or right, within the guideway. The geometry of the upper switch arms is designed so that the line of application of force exerted on the switch wheels will be perpendicular to the switch channels and will pass directly through the pivot points of the switch arms. A similar geometry is provided for the lower switch arms so that a force exerted there will pass directly through the pivot point of the lower arm.

SUMMARY OF THE INVENTION

In accordance with one aspect of the present invention, there is thus provided a personal transportation system that includes a plurality of personal transportation vehicles, a track network, a guidance mechanism, and a stabilization mechanism. Each personal transportation vehicle (PTV) includes a main section and a driving mechanism. The main section defines a lateral width adapted to contain a single occupant. The driving mechanism is configured to propel the PTV, and includes at least one track engaging element, protruding downwards from the main section and defining a lateral width narrower than the lateral width of the main section such that the main section is prone to fall over when the PTV is at rest, whereby the space between the lateral width of the main section and the lateral width of the track engaging element can be occupied by public infrastructure. The track network includes a series of track sections on which the plurality of PTVs is driven. Each track section includes a ground portion, defining a lateral width minimally adapted to accommodate the lateral width of the track engaging element. Each track section further includes an empty space above the ground portion, the empty space being free of non-transient obstacles, the empty space defining a lateral width adapted to minimally accommodate the lateral width of the main section. The guidance mechanism is configured to guide the PTV when traveling along the track network and to prevent the PTV from deviating from the track sections using: at least one external rail, configured to engage with a coupling element of the PTV and to maintain the PTV on a current track section, and/or an internal guidance control system, configured to detect boundaries or a centerline of a current track section and control steering of the PTV to maintain the PTV within the detected boundaries or aligned with the detected centerline.

The stabilization mechanism is configured to stabilize the PTV when traveling along the track network and to prevent the PTV from falling over when turning or merging or diverging. The stabilization mechanism may include at least one of: at least one connector arm including a coupling element, engageable with a stabilization rail fixedly mounted along a track section of the track network; at least one stabilization rail, fixedly mounted along a track section of the track network and configured to engage with a portion of the PTV; at least one side wheel, extending below the main section and configured to engage with and apply a complementary lateral force to a track section; at least one weight sensor, configured to detect the weight carried by the PTV; at least one angular sensor, configured to detect the inclination of the PTV; and an internal weight, disposed within the PTV and configured to provide a counterforce to stabilize the PTV during PTV motion. At least a portion of the stabilization rail may be located at ground level below ground or at a low height above ground. The connector arm may be a detachable connector arm, to enable detachment of at least one detachable connector arm on a selected side of the PTV to guide the PTV in a selected direction of the track network. The PTV may further include a vehicle control unit, configured to guide and direct the PTV on the track network. The vehicle control unit may include at least one detector, such as: a detector configured to detect a marker indicative of at least one property relating to a track section; a detector configured to detect potential dangers in the vicinity of a track section; and/or a location detection unit, configured to provide information relating to at least one of: position; direction; and velocity, of the PTV. The driving mechanism may include: a wheel array, comprising a plurality of wheels aligned along a single laterally centered axis of the PTV underneath the main section; at least one electrical propulsion mechanism; and/or at least one magnetic propulsion mechanism. A track section may include a track integrated with at least a portion of public transit infrastructure including: a road; a road shoulder; a road verge; a road median; a sidewalk; a walking path; a driving lane; a cycling lane; a running lane; a dividing barrier; a bridge; and/or a tunnel. A track section may include a track adjacent to a road or sidewalk, such that at least a portion of the main section of the PTV extends over the road or sidewalk when traveling over the track. The number of lanes of a track section may be selectively allocated, in accordance with requirements or restrictions relating to: the PTV; location of the track section; and/or temporal requirements. The PTV may be configured to selectively expand or reduce the lateral width of a track engaging element thereof, to conform to width requirements of a track section. The lateral width of the track engaging element may be less than half of the lateral width of the main section. The lateral width of the track engaging element may be less than 35 cm and wherein the lateral width of the main section is in the range of 60-100 cm. The main section may include: a wide upper portion, adapted to accommodate the upper body of a passenger; and a narrow lower portion, adapted to accommodate the lower body of the passenger, where the stabilization rail is configured to engage with the narrow lower portion of the main section, such that the lateral width of the narrow lower portion together with the stabilization rail does not exceed the lateral width of the upper wider portion of the main section.

In accordance with another aspect of the present invention, there is thus provided a method for personal transportation. The method includes the procedure of providing a plurality of personal transportation vehicles, each personal transportation vehicle (PTV) including a main section and a driving mechanism. The main section defines a lateral width adapted to contain a single occupant. The driving mechanism is configured to propel the PTV and includes at least one track engaging element, protruding downwards from the main section and defining a lateral width narrower than the lateral width of the main section such that the main section is prone to fall over when the PTV is at rest, whereby the space between the lateral width of the main section and the lateral width of the track engaging element can be occupied by public infrastructure. The method further includes the procedure of providing a track network that includes a series of track sections on which the plurality of PTVs is driven. Each track section includes a ground portion, defining a lateral width minimally adapted to accommodate the lateral width of the track engaging element. Each track section further includes an empty space above the ground portion, the empty space being free of non-transient obstacles, the empty space defining a lateral width adapted to minimally accommodate the lateral width of the main section. The method further includes the procedure of guiding the PTV when traveling along the track network and preventing the PTV from deviating from the track sections using a guidance mechanism that uses: at least one external rail, configured to engage with a coupling element of the PTV and to maintain the PTV on a current track section and/or an internal guidance control system, configured to detect boundaries or a centerline of a current track section and control steering of the PTV to maintain the PTV within the detected boundaries or aligned with the detected centerline. The method further includes the procedure of stabilizing the PTV when traveling along the track network and preventing the PTV from falling over when turning or merging using a stabilization mechanism. The stabilization mechanism may include at least one of: at least one connector arm including a coupling element, engageable with a stabilization rail fixedly mounted along a track section of the track network; at least one stabilization rail, fixedly mounted along a track section of the track network and configured to engage with a portion of the PTV; at least one side wheel, extending below the main section and configured to engage with and apply a complementary lateral force to a track section; at least one weight sensor, configured to detect the weight carried by the PTV; at least one angular sensor, configured to detect the inclination of the PTV; and an internal weight, disposed within the PTV and configured to provide a counterforce to stabilize the PTV during PTV motion. At least a portion of the stabilization rail may be located at ground level below ground or at a low height above ground. The connector arm may be a detachable connector arm, to enable detachment of at least one detachable connector arm on a selected side of the PTV to guide the PTV in a selected direction of the track network. A track section may include a track integrated with at least a portion of public transit infrastructure including: a road; a road shoulder; a road verge; a road median; a sidewalk; a walking path; a driving lane; a cycling lane; a running lane; a dividing barrier; a bridge; and/or a tunnel. A track section may include a track adjacent to a road or sidewalk, such that at least a portion of the main section of the PTV extends over the road or sidewalk when traveling over the track. The methods may further include the procedure of guiding a PTV through a diverging junction, by detaching a connecting arm on one side of the PTV from a respective side stabilization rail, when approaching the diverging junction, so as to guide the PTV toward the opposite side by maintaining the PTV linked only to the stabilization rail on the opposite side. The methods may further include the procedure of guiding a PTV through a merging junction, by detaching a connecting arm on one side of the PTV from a respective side stabilization rail, when approaching the merging junction from the opposite side, so as to maintain the PTV linked to the stabilization rail on the opposite side until completion of merging. The number of lanes of a track section may be selectively allocated, in accordance with requirements or restrictions relating to: the PTV; location of the track section; and/or temporal requirements. The lateral width of the track engaging element may be less than half of the lateral width of the main section. The lateral width of the track engaging element may be less than 35 cm and wherein the lateral width of the main section is in the range of 60-100 cm. The main section may include: a wide upper portion, adapted to accommodate the upper body of a passenger; and a narrow lower portion, adapted to accommodate the lower body of the passenger, where the stabilization rail is configured to engage with the narrow lower portion of the main section, such that the lateral width of the narrow lower portion together with the stabilization rail does not exceed the lateral width of the upper wider portion of the main section.

BRIEF DESCRIPTION OF THE DRAWINGS

The present invention will be understood and appreciated more fully from the following detailed description taken in conjunction with the drawings in which:

FIG. 8A is a side sectional view schematic illustration of a PTV with detachable connecting arms in a transitional descending stage, constructed and operative in accordance with an embodiment of the present invention descended;

FIG. 8B is a rear sectional view schematic illustration of a PTV with mechanically coupled detachable connecting arms descended underground, constructed and operative in accordance with an embodiment of the present invention;

FIG. 8C is a rear sectional view schematic illustration of a PTV with magnetically coupled detachable connecting arms descended underground, constructed and operative in accordance with an embodiment of the present invention;

FIG. 8D is a rear sectional view schematic illustration of the PTV of FIG. 8A with connecting arms positioned on a dedicated stabilization rail above ground, constructed and operative in accordance with an embodiment of the present invention;

DETAILED DESCRIPTION OF THE EMBODIMENTS

The present invention overcomes the disadvantages of the prior art by providing a personal transportation system and method that provides efficient, safe and convenient transportation, utilizes limited road space, and is easily adapted into various types of environments and public road configurations. Designated personal transportation vehicles, of narrow width and adapted to contain a single occupant or cargo, are guided on a track network along their respective travel routes. The personal transportation vehicles are stabilized to prevent overturning, and potential dangers along the track network may be detected and removed. The personal transportation vehicle may be characterized by a space between a wider vehicle main section and a narrower vehicle track engaging element which can be occupied by public infrastructure. The disclosed personal transportation system serves to substantially reduce road congestion, and diminish air and noise pollution from conventional private and public transport vehicles. The disclosed personal transportation system is also capable of being integrated into existing public transit infrastructure with reasonable costs and minimal interference to other vehicles or pedestrians. The disclosed personal transportation system may also enable seamless travel with lane changing and merging and diverging operations for a large capacity of personal transportation vehicles in a multilane and multijunction track network.

Figure 1:
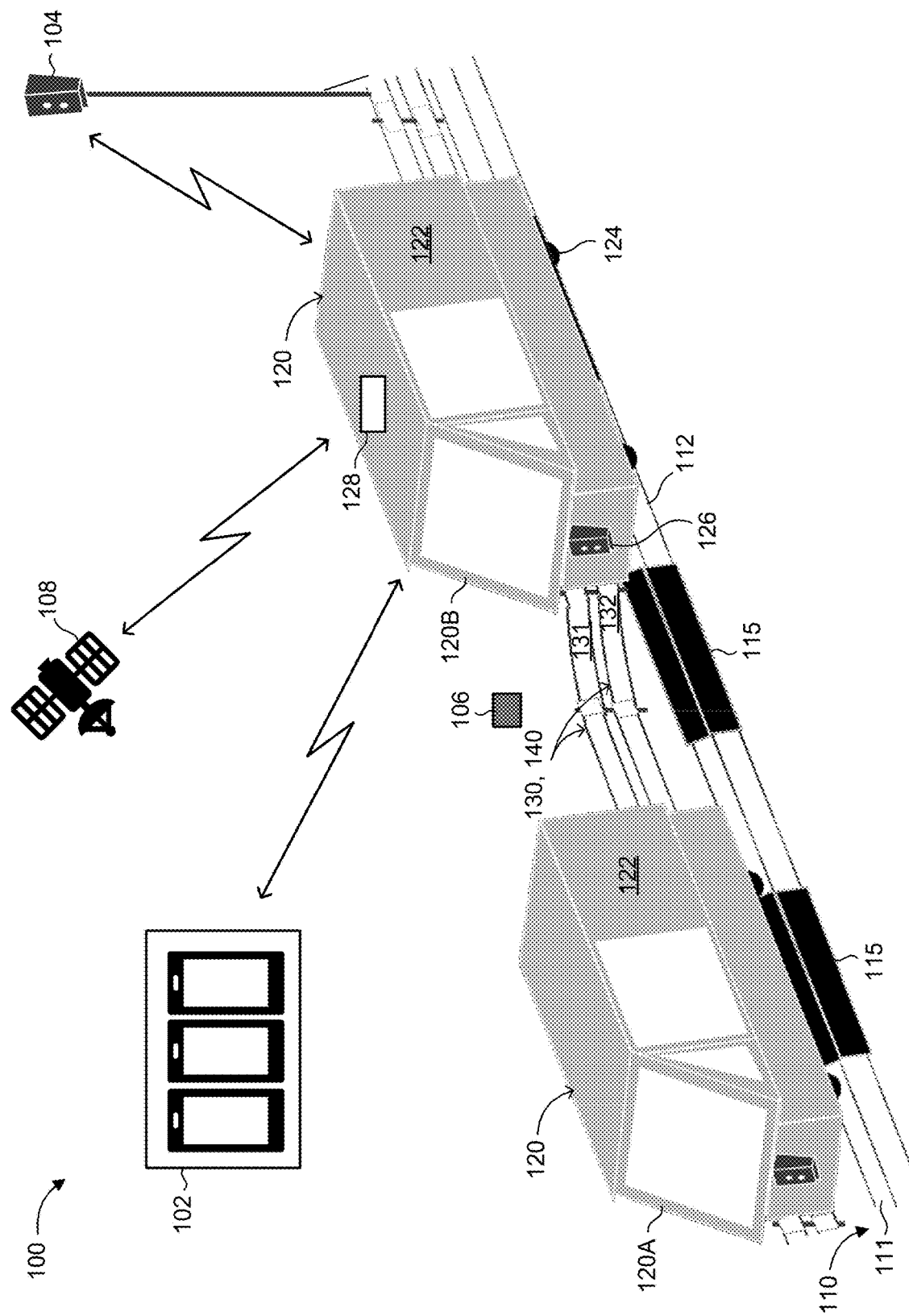
FIG. 1 is a schematic illustration of a personal transportation system, constructed and operative in accordance with an embodiment of the present invention.

Reference is now made to FIG. 1, which is a schematic illustration of a personal transportation system, generally referenced 100, constructed and operative in accordance with an embodiment of the present invention. System 100 includes a plurality of personal transportation vehicles (PTVs) 120, a track network 110, a stabilization mechanism 130, a guidance mechanism 140, a central controller 102, at least one long range track sensor 104, and at least one short range track sensor 106. Each PTV 120 is communicatively coupled with central controller 102, with track sensors 104 and 106, and with other PTVs 120. PTVs 120 are driven along track network 110.

Each PTV 120 is characterized by a main section 122 and a driving mechanism 124. Main section 122 is configured to contain a single passenger with minimal personal belongings. Alternatively, main section 122 may contain freight or cargo having a size and weight not larger than that of a typical single passenger. The terms "user", "operator" and "passenger" are used interchangeably herein to refer to any individual person or group of persons using a personal transportation vehicle of the system of the present invention. Main section 122 may include a seat to allow the user to be seated. Alternatively, the user may stand during the drive, and main section 122 may include a foot platform for the user to stand on and configured to support the weight of the user. The size of main section 122, particularly the lateral width thereof, is preferably as small as possible while still being large enough to contain a single passenger. For example, the dimensions of section 122 may be approximately 60-100 cm (e.g., 70 cm) in width, approximately 120-180 cm (e.g., 160 cm) in length, and approximately 115-200 cm (e.g., 165 cm) in height. It is appreciated that main section 122 is not necessarily configured as an enclosed compartment, and may alternatively be an open area, as common in two-wheeled vehicles such as motorcycles, scooters, mopeds, and the like.

Driving mechanism 124 includes components for enabling PTV 120 to be propelled along track network 110. Driving mechanism 124 includes a track engaging element extending underneath main section 122, which may be embodied by one or more wheels and wheel axles (e.g., a four-wheeled vehicle such as an automobile; a two-wheeled vehicle such as a motorcycle or moped, or even a single wheeled vehicle such as a unicycle). The wheels may be propelled using conventional motor vehicle propulsion systems, such as an internal combustion engine, which may be fueled using fossil fuels or alternative fuel types (e.g., ethanol, biodiesel, natural gas). PTV 120 may alternatively or additionally be propelled using electric power, such that driving mechanism 124 may include an electric motor, an electric power source (e.g., battery or fuel cell) and associated electric vehicle (EV) components. PTV 120 may also obtain electric power from sources situated on or adjacent to track network, such as a conductor rail and pickup shoe embedded within at least a portion of a track (e.g., as used in many trains and subway systems), an underground power cable, an overhead power transmission line (e.g., as used in streetcars and trolley buses), and/or an electric charging station. PTV 120 may further alternatively be propelled using magnetic or electromagnetic propulsion, e.g., similar to magnetic levitation (maglev) trains, such that driving mechanism 124 (and/or track network 110) may include elements configured to generate magnetic levitation (e.g., via electromagnetic suspension or electrodynamic suspension), such as a linear induction motor. Other propulsion technologies are also applicable, such as solar power or wind power, and multiple propulsion mechanisms may be integrated in a "hybrid" type model. Driving mechanism 124 may also include vehicle propulsion elements situated at least partially in main compartment 122 of PTV 120. PTV 120 may be an autonomous or self-driving vehicle, or may be manually operated. The lateral width of the track engaging element of driving mechanism 124 may be less than half the lateral width of main section 122. For example, the width of main section 122 may be in the range of 60-100 cm (e.g., 70 cm), and the width of the track engaging element may be less than 35 cm (e.g., 30 cm). More generally, the lateral width of the track engaging element may be narrower than the lateral width of the main section such that the main section is prone to fall over or overturn (e.g., due to an inherent instability) when the PTV is at rest.

Each PTV 120 also includes a vehicle control unit 126 and a location detection unit 128. Vehicle control unit 126 is configured to guide and direct PTV 120 over track network 110, such as by ensuring that PTV 120 is maintained on the correct tracks and following the proper driving route, and is driving within the prescribed speed and acceleration limits for a given track section. Vehicle control unit 126 may include at least one detector or scanner, such as: a camera, a radio-frequency identification (RFID) device, an optical detector, a laser detector (e.g., laser rangefinder or LIDAR), a radar detector, and the like. The detector may be configured to detect and identify an optical marker situated along the track network, such as lane markings, which may have characteristic colors or patterns reflective of certain track properties (e.g., lane direction, lane boundaries, turn intersections, merging, diverging or stopping locations, and the like). Vehicle control unit 126 may be further configured to prevent accidents and collisions. For example, the vehicle control unit detector may detect obstacles or other potential dangers on or approaching a track along the route of a PTV 120, and direct the PTV 120 to divert its route or to decelerate so as to avoid the detected obstacle. Vehicle control units 126 of respective PTVs 120 may also communicate with one another, such as to provide warnings of obstacles or incoming vehicle traffic and prevent collisions with one another.

PTV 120 also includes a location detection unit 128, which may include components and/or applications associated with a global navigation satellite systems (GNSS), such as global positioning system (GPS). Accordingly, location detection unit 128 may be embodied by a GPS receiver configured to receive geolocation information from a GNSS satellite 108, but may also include additional components configured to provide information relating to the position, direction and/or velocity of the moving vehicle, such as motion sensors (e.g., accelerometers), rotational sensors (e.g., gyroscopes), inertial measurement units (IMUs), or other navigational devices known in the art.

PTV 120 may further include additional vehicle accessories, such as basic components commonly found in many standard vehicles, which may be disposed on or within main section 122. For example, PTV 120 may include: driving and braking components (e.g., steering wheel, gas pedal, brake pedal, motor, suspension, transmission or gearbox, indicators); an instrumentation panel (e.g., odometer, speedometer, fuel and temperature gauges, navigational information such as maps or driving route); headlights; windshield wipers; air conditioning/heating unit; communication tools; safety mechanisms (e.g., seatbelts, airbags), collision avoidance systems; and the like.

PTV 120 may further include a user interface (not shown), to allow a vehicle operator or passenger to control parameters or settings associated with components of system 100, such as to provide instructions to vehicle control unit 126, or to enable manual control of selected driving operations. For example, PTV 120 may include devices or components adapted to perform standard vehicle operations, such as a joystick or manual controller adapted to control selected driving operations, such as: initiation of a drive, braking, acceleration, deceleration, turning, route selection, and the like. The user interface may be a cursor or touch-screen menu interface to enable manual input of instructions or data, and/or an audio interface to allow for audible instructions or voice commands. The user interface may also be used to indicate relevant information to the vehicle operator, such as information detected by track sensors 104, 106 (e.g., current vehicle location, speed, driving route, estimated time of arrival, potential obstacles, other PTVs in the vicinity). For example, a display or graphical interface may be used to display information visually, and an audio speaker may be used to indicate information audibly.

Track network 110 includes a series of tracks or driving paths on which a PTV 120 can be driven. The tracks may include or be integrated with at least a portion of existing public transit infrastructure, including but not limited to: a road, a road shoulder, a road verge, a road median, a sidewalk or walking path, a driving lane, a cycling lane, a running lane, a dividing barrier, a bridge; and/or a tunnel. For example, a track section may be embodied by an existing transit path or driving lane on which a wheel-propelled PTV can be driven, such as a road shoulder, a section of a sidewalk, or a dividing barrier. Alternatively, a track section may be a dedicated lane specifically devised for PTV transport, such as a narrow PTV pathway established between a road and a sidewalk, or a dedicated PTV bridge or PTV tunnel. Referring to FIG. 1, a first PTV 120A (shown on the left side of the Figure) is driving on a first track section 111 defined by a portion of the sidewalk curb, referenced 115, such that the wheels of first PTV 120A pass over the sidewalk curb 115, while the main compartment 122 of first PTV 120A extends laterally on either side of sidewalk curb 115. A second PTV 120B (shown on the right side of the Figure and behind first PTV 120A) is driving on a second track section 112 defined by the road portion adjacent to sidewalk curb 115, such that the wheels of second PTV 120B pass over the road lane, while one side of the main compartment 122 of second PTV 120B extends laterally over sidewalk curb 115. When second PTV 120B reaches first track section 111, the wheels of second PTV 120B may shift to driving on sidewalk curb 115 and continue along track section 111 (i.e., similar to PTV 120A).

A track section may be characterized by a paved surface to facilitate vehicle propulsion, particularly for wheeled vehicles. A track section may also include railway tracks, fasteners, ballasts, and/or infrastructure for supporting electrical or magnetic powered vehicles, such as linear induction motors. A track section may include boundary elements, such as physical dividers (e.g., a partition fence, a barrier, a series of bollards) or simple lane markings, to delineate the PTV driving path from adjacent pathways such as regular vehicle driving lanes or pedestrian walkways. More generally, a track section may be embodied physically (e.g., by means of paved surfaces, lane markings, railway track infrastructure, and the like) or virtually (e.g., a simple pathway, such as a portion of an existing sidewalk or road shoulder, without necessarily having a signifier or physical characteristic defining it as such). Exemplary configurations of track network 110 will be provided hereinbelow (e.g., with reference to FIGS. 9-11).

Track network 110 may be generally characterized by a ground track portion and an empty space above the ground track portion. The ground track portion defines a lateral width which is adapted to minimally accommodate the lateral width of a track engaging propulsion element of driving mechanism 124 of PTV 120. For example, if the propulsion element of driving mechanism 124 is embodied by one or more wheels, then the lateral width of the ground track portion may be approximately 3-40 cm (e.g., 10 cm) so as to accommodate the width of the PTV wheels and wheel axles, while occupying minimal additional space beyond the necessary amount. Correspondingly, the empty space of track network 110 defines a lateral width above the ground track portion which is adapted to minimally accommodate the lateral width of main section 122 of PTV 120. For example, if the width of main section 122 is approximately 70 cm, then the lateral width of the empty space may be minimally larger than 70 cm, in order to fully accommodate main section 122 of PTV 120, while still ensuring that main section 122 does not interfere with surrounding artifacts adjacent to the track. The empty space can be considered to begin at a height directly above the track engaging propulsion element of driving mechanism 124, or at the bottom of main compartment 122. For example, if the main compartment 122 is 70 cm in width and begins at a height of 30 cm above the ground, where the propulsion element dimensions are 10 cm in width and 30 cm in height, then the ground track portion (defining a lateral width minimally larger than 10 cm) occupies an area below a height of 30 cm, whereas the empty space portion (defining a lateral width minimally larger than 70 cm) occupies an area above 30 cm height (and extending upwards to at least the top of main compartment 122). The empty space should be free of permanent or fixed obstacles and obstructions, to allow for clear and safe passage of PTVs 120 along track network 110, but may contain transient objects resulting from uncontrollable natural events or human activities (e.g., wind-blown debris, waste, small animals), which may be removed upon detection to enable clear and safe passage.

Figure 2B:
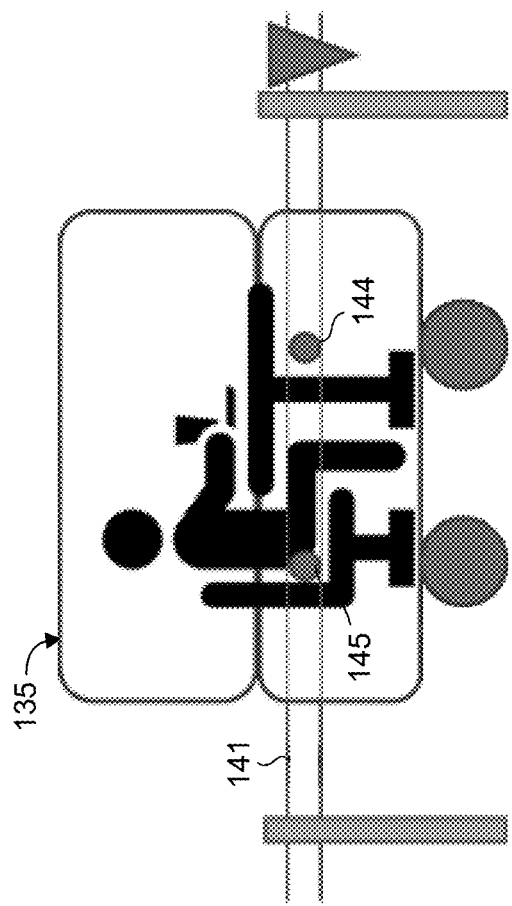
FIG. 2B is a right side view schematic illustration of the PTV and stabilization rails of FIG. 2A.
Figure 2A:
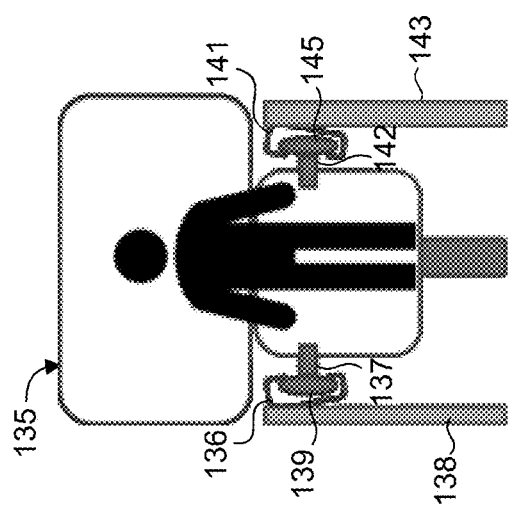
FIG. 2A is a rear view schematic illustration of a personal transportation vehicle with a stabilization rails on each side, constructed and operative in accordance with an embodiment of the present invention.

System further includes at least one stabilization mechanism 130 for stabilizing PTV 120 when driven and/or when stationary. Stabilization mechanism 130 may be coupled with PTV 120 and/or with a fixed structure on or near track network 110. For example, stabilization mechanism 130 may include one or more stabilization rails 131 and 132, which may be integrated with or connected to a fixed mounting structure, such as a wall or fence or post, along a PTV track. The stabilization rails may be aligned laterally, and configured to support a PTV 120, such as by engaging with a respective connector arm coupled to a respective side of the PTV main section 122. A coupling element, such as a mechanical or magnetic coupling mechanism, may be disposed at an end of the connector arm and configured to removably engage with a stabilization rail. Alternatively, the coupling element may be situated directly on PTV 120, such as a magnetic coupling mechanism positioned disposed on an internal or external surface of the PTV main section 122. Reference is made to FIGS. 2A and 2B. FIG. 2A is a rear view schematic illustration of a personal transportation vehicle, generally referenced 135, with a stabilization rail on each side, constructed and operative in accordance with an embodiment of the present invention. FIG. 2B is a right side view schematic illustration of the PTV and stabilization rails of FIG. 2A. PTV 135 includes a left stabilization rail 136 and a right stabilization rail 141, configured to support and stabilize PTV 135. Left stabilization rail 136 is coupled to PTV 135 via at least one connector arm and at least one respective coupling element (e.g., mechanical bearings). For example, a front left connector arm (not shown), positioned on the front left side of the PTV main section, is coupled with left stabilization rail 136 via a front left coupling element (not shown), and a rear left connector arm 137, aligned with and positioned rearward of the front left connector arm, is coupled with left stabilization rail 136 via a rear left coupling element 139. Correspondingly, a front right connector arm (not shown), positioned on the front right side of the PTV main section, is coupled with right stabilization rail 141 via a front right coupling element 144 (depicted in FIG. 2B), and a rear right connector arm 142, aligned with and positioned rearward of the front right connector arm, is coupled with right stabilization rail 141 via a rear right coupling element 145. Left stabilization rail 136 is mounted on a first fixed post 138 (or other mounting structure) situated on the left side of a PTV track, and right stabilization rail 141 is mounted on a second fixed post 143 (or other mounting structure) situated on the right side of the PTV track. The term "connector arm" as used herein should be broadly interpreted to refer to any element or portion of an element that externally protrudes from the PTV and which is configured to engage (directly or indirectly) with a stabilization rail, such as via a coupling element thereof. Similarly, the term "stabilization rail" as used herein should be broadly interpreted to refer to any element or portion of an element that is mounted externally to the PTV (e.g., on a separate mounting structure) and which is configured to engage (directly or indirectly) with a connector arm of a PTV, such as via a coupling element thereof.

Figure 3B:
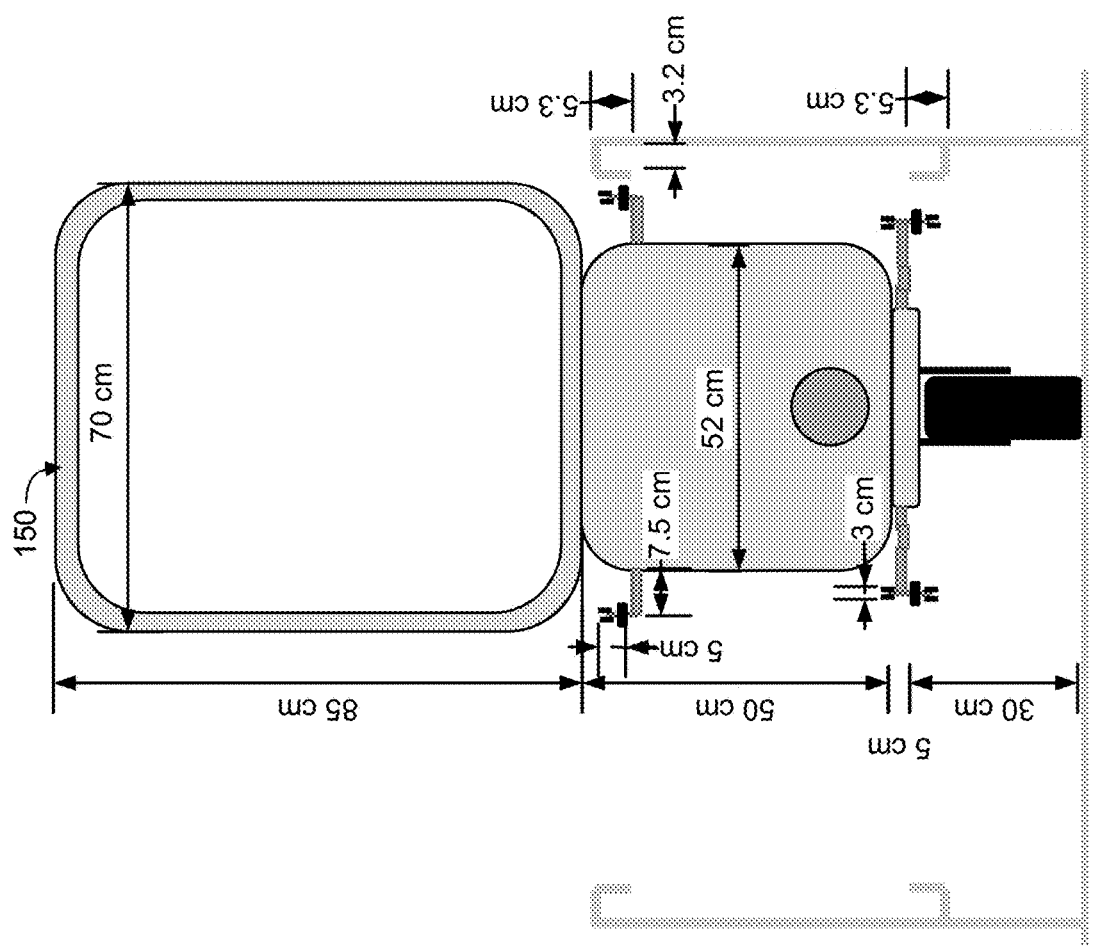
FIG. 3B is a front view schematic illustration of the personal transportation vehicle of FIG. 3A separate from the stabilization rails.
Figure 3A:
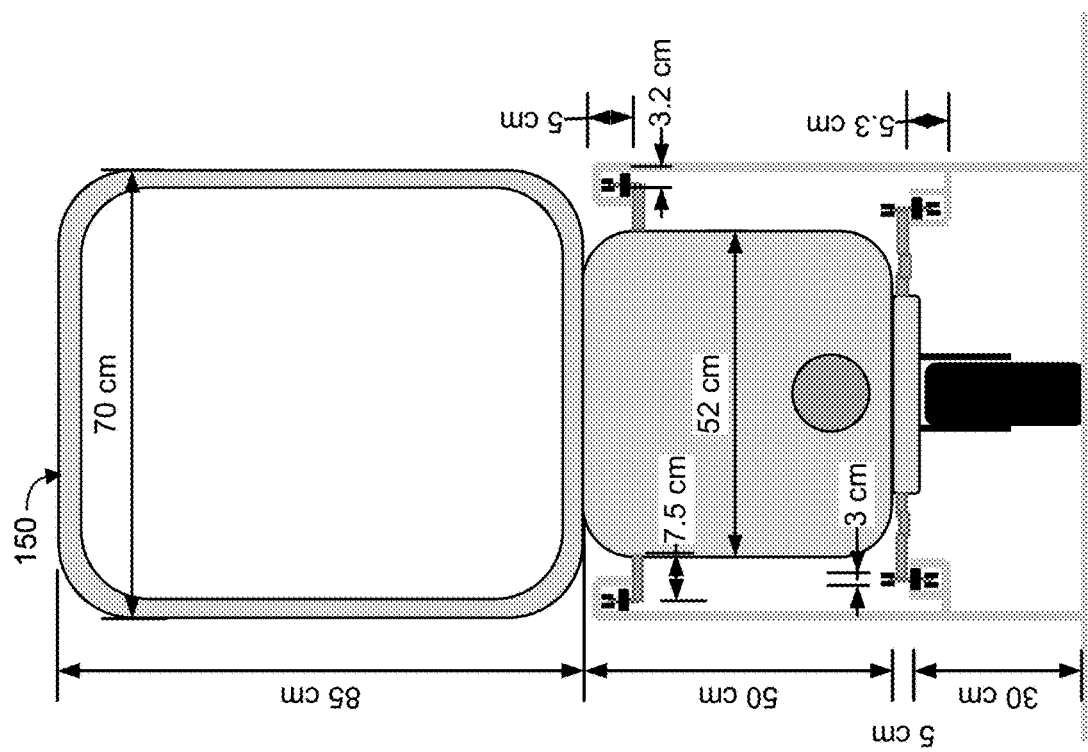
FIG. 3A is a front view schematic illustration of a personal transportation vehicle and stabilization mechanism with exemplary dimensions, constructed and operative in accordance with an embodiment of the present invention.
Figure 3C:
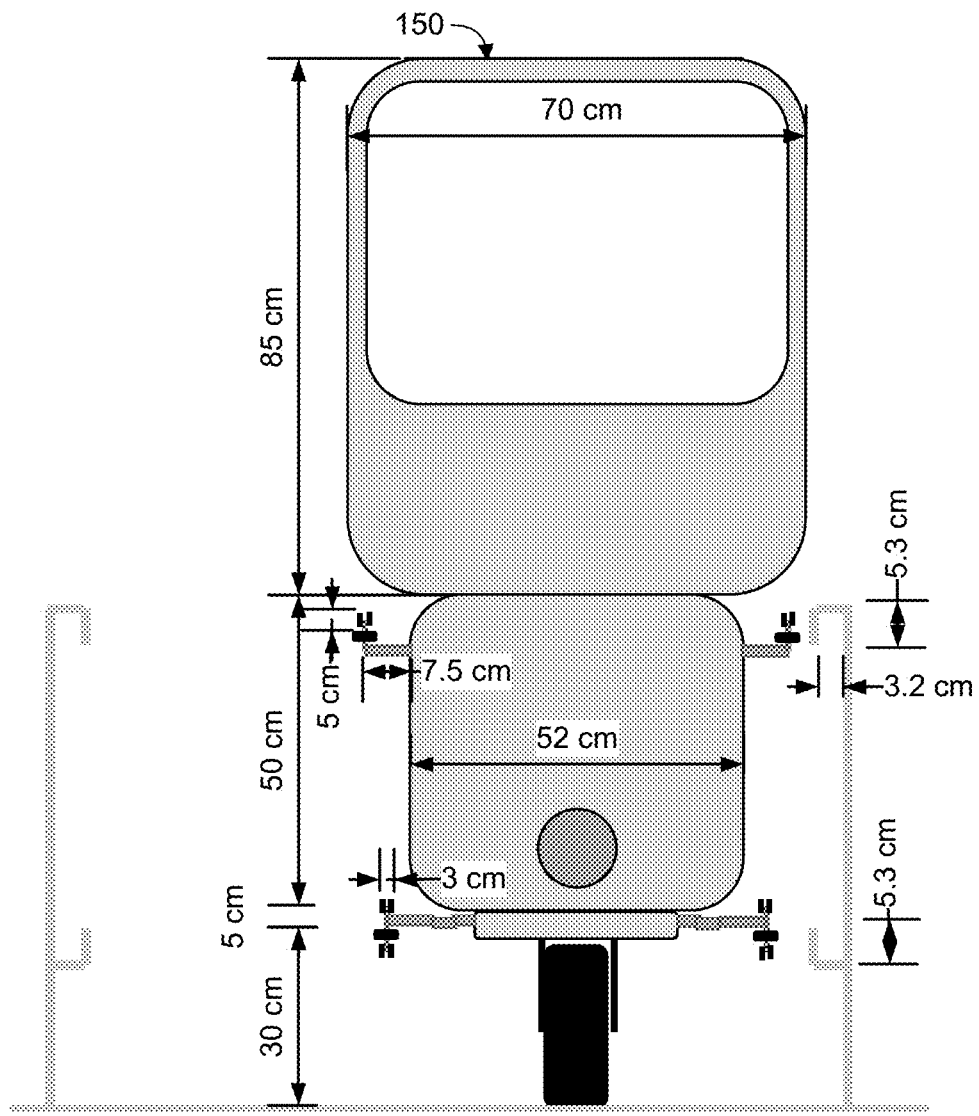
FIG. 3C is a rear view schematic illustration of the personal transportation vehicle of FIG. 3B.
Figure 3D:
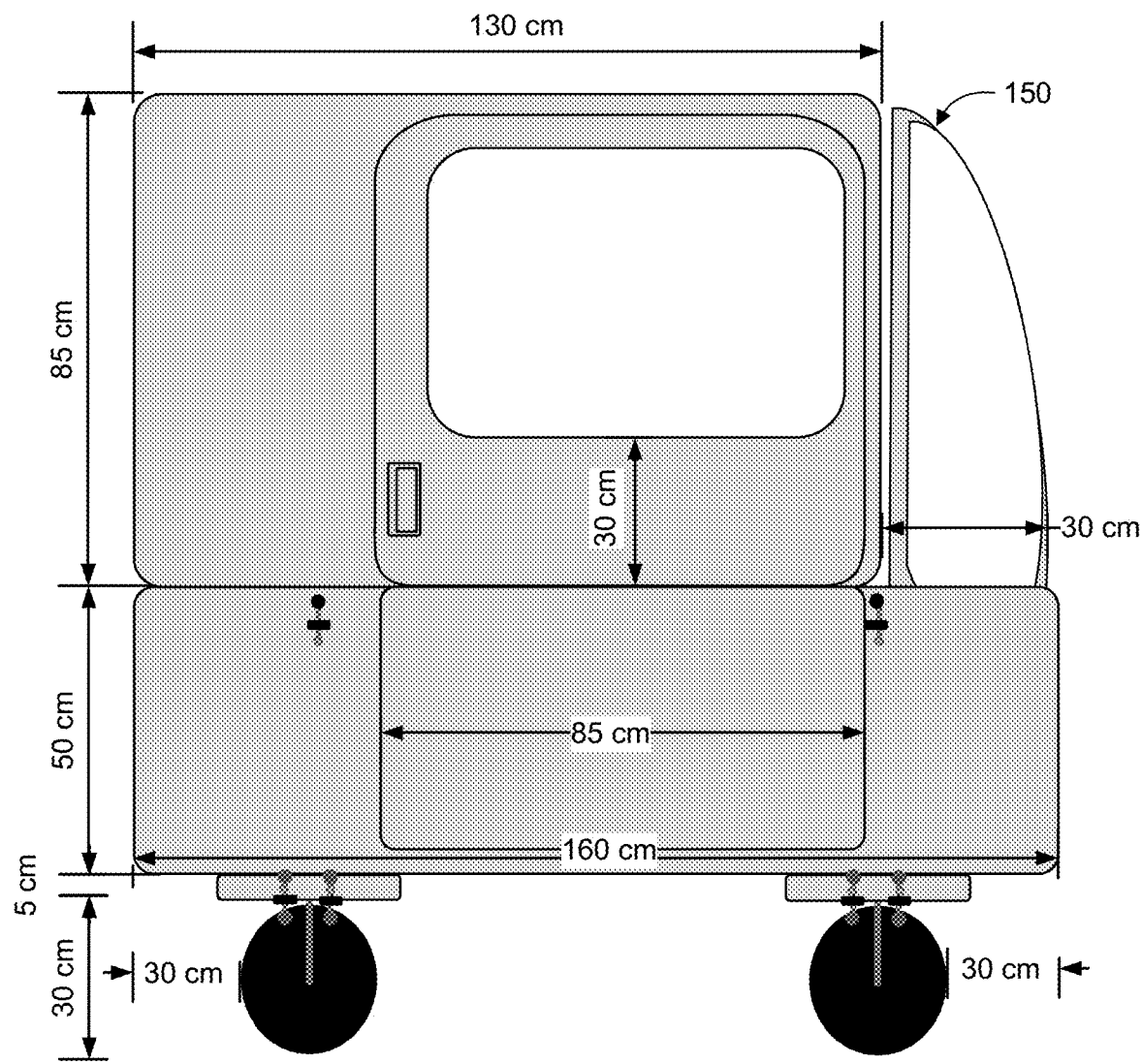
FIG. 3D is a right side view schematic illustration of the personal transportation vehicle of FIG. 3B.

The stabilization rails may be elevated from the ground surface to facilitate the passage of two-wheeled PTVs, by allowing such vehicles to move along the edge of the track which may be part an existing public transport lane, such as a sidewalk or road shoulder, while occupying a minimal amount of space (track width). Moreover, elevated stabilization rails may engage with the PTV substantially near its center of mass, to reliably safeguard against the possibility of overturning, even for relatively unstable PTV types (e.g., narrow body vehicles) or unstable driving scenarios (e.g., at high speeds and/or sharp turns). The stabilization rails may be configured to engage with a lower and narrower region of PTV main section 122 (e.g., under the passenger hand rests), such that they will not protrude relative to an upper and wider region of main section 122. For example, when the passenger's arms are laid on the side armrests, the upper part of the passenger's body (i.e., from the arms/shoulders upwards) may occupy a greater width than the lower part of the passenger's body (i.e., below the arms/shoulder). This may allow the main section 122 to be configured with a wider upper portion, e.g., having a lateral width of approximately 70 cm (so as to accommodate the wider upper body of the passenger), and a narrower lower portion, e.g., having a lateral width of approximately 50 cm (so as to accommodate the narrower lower body of the passenger). In this case, the stabilization rails may engage with the narrow lower portion of the main section, such that the lateral protrusion of the rails on either side of the narrower lower portion, would not exceed the lateral width of the upper wider portion of the main section. For example, if the rails protrude by 10 cm on either side, then the overall width of the narrow lower portion together with the two rails would be 70 cm similar to the upper wider portion. It is further appreciated that the space underneath the PTV main section on either side of the track engaging element underneath the main section (resulting from the difference in the lateral width of the main section relative to that of the narrower track engaging element), can be occupied by public infrastructure (e.g., such as a sidewalk or a road section) allowing for effective maneuvering of PTV along narrow tracks adjacent to existing road infrastructure. Reference is made to FIGS. 3A, 3B, 3C and 3D. FIG. 3A is a front view schematic illustration of a personal transportation vehicle, referenced 150, and stabilization mechanism, with exemplary dimensions, constructed and operative in accordance with an embodiment of the present invention. FIG. 3B is a front view schematic illustration of PTV 150 separate from the stabilization rails. FIG. 3C is a rear view schematic illustration of PTV 150. FIG. 3D is a right side view schematic illustration of PTV 150.

A single stabilization rail on one side of the PTV may be sufficient to provide basic support and stabilization, while a pair of stabilization rails with one on each side, or two stabilization rails on one side, may provide enhanced support and stabilization. Further alternatively, two pairs of stabilization rails with two rails on each side of the PTV may provide additional capabilities, such as to allow merging and diverging of the PTV (as will be elaborated upon further hereinbelow), while still maintaining support and stabilization during the drive. Stabilization rails 131, 132 may be mounted onto poles or support structures (depicted as vertical dashed lines in FIG. 1) adjacent to a track section, or embedded in a dividing barrier or wall. The stabilization rails may be positioned at a sufficient height so as to ensure that the rails provide effective stabilization, such as to at least prevent the PTV from overturning, while additionally providing transportation flexibility in certain track locations and terrains, such as near a sidewalk, or trees, or other natural or artificial objects nearby that may interfere with PTV passage. For example, the stabilization rails may be situated at a height of approximately 20-70 cm from the ground (as depicted in FIGS. 3A, 3B and 3C). In the embodiment depicted in FIG. 1, the two stabilization rails 131, 132 are configured such that the upper rail 131 engages with an upper part of main portion 122 of PTV 120, above the center of mass thereof, while the lower rail 132 engages with a lower part of main portion 122 below the center of mass, thereby substantially minimizing the likelihood of a PTV overturning, even during sharp turns or at high speeds. Alternatively, a single stabilization rail on one side may be sufficient in certain environments (e.g., for certain track section locations or terrains, such as with minimal nearby interference). Conversely, multiple stabilization rails on each side may be necessary for other circumstances. It is noted that if a PTV connector arm is rigidly coupled to the PTV, the range of motion of the PTV may be limited, particularly its ability to maneuver during sharp turns (i.e., at low radius turn angles). Accordingly, a PTV connector arm that engages with a stabilization rail may be characterized with a flexible or non-rigid coupling to the PTV, to provide enhanced PTV maneuverability during turning operations, and particularly to facilitate the execution of sharp turns. Such sharp turns may also be severely restricted when the PTV is coupled to a side stabilization rail (positioned on either side of the PTV main section), and therefore the PTV may be stabilized and guided during sharp turns using only a bottom stabilization rail positioned directly underneath the PTV main section to enable greater range of movement during sharp turns.

Stabilization mechanism 130 may be configured to mechanically engage with the wheels of a wheel-propelled vehicle, or to electromagnetically engage with (but not necessarily be in directed contact with) magnetic elements of an electromagnetic-propelled vehicle, in order to stabilize such vehicles. Stabilization mechanism 130 may alternatively be configured to engage with at least one side of the PTV, such as the right side or left side of main section 122, such as using stabilization rails and connector arms. Stabilization mechanism 130 may further alternatively be configured to engage with an upper section of a PTV 120, such as a top of main section 122 (e.g., a roof). Stabilization mechanism 130 may also be positioned underneath PTV 120, above or below a track section, such as underground. A further example of stabilization mechanism 130 may be a weight, embedded within a portion of PTV 120, such as a balance weight configured to provide enhanced stability to a vehicle prone to instability or lack of balance (such as a two-wheeled or one-wheeled vehicle).

System further includes at least one guidance mechanism 140 for guiding PTV 120 along track network 110 and preventing PTV 120 from deviating from the proper track sections. Guidance mechanism 140 may be embodied by guardrails, such as stabilization rails 131, 132 of stabilization mechanism 130, which may be configured to engage with a mechanical or magnetic coupling element at the end of respective connector arms of PTV 120 and maintain the PTV on the current track section. Accordingly, at least some of the same elements or components may be used for both stabilization and for guidance. Guidance mechanism 140 may be configured to engage with a bottom portion of PTV 120 (e.g., with the wheels of a wheel-propelled PTV), or with at least one side of PTV 120 (e.g., one or both sides of main section 122), or with an upper portion of PTV 120 (e.g., a top of main section 122). Guidance mechanism 140 may include an internal guidance control system configured to prevent PTV 120 from deviating from a designated route, and/or to maintain PTV 120 along a centerline of the track network 110, using techniques known in the art of vehicle guidance. For example, the internal guidance control system may include a detection component, such as one or more optical sensors, operative to detect the boundaries at each side (i.e., right side and left side) of the current track section, and a processing component operative to (e.g., automatically and continuously) control the vehicle steering mechanism to maneuver PTV 120 such that PTV 120 remains at least within the detected track section boundaries, such as by keeping PTV 120 substantially aligned with a centerline of the track section. Such an internal guidance control system may be utilized in conjunction with a clear delineation of the track section boundaries or track centerline using well-defined markings capable of being detected by suitable (e.g., optical based) detection components, such as selectively colored markings. The internal guidance control system may modify or terminate the vehicle motion (e.g., by controlling the vehicle steering mechanism) if certain conditions are met, such as in the event that the vehicle deviates from the track centerline by at least a preselected threshold amount, which may be designated in accordance with the properties and characteristics of the particular PTV. The internal guidance control system may include or be integrated with at least a portion of vehicle control unit 126, such as by utilizing at least one of the detectors of vehicle control unit 126.

Central controller 102 is responsible for controlling the general operation of system 100. For example, central controller 102 may manage functions such as: traffic control and route management (e.g., monitoring PTV locations in real-time, establishing a driving route and driving speed for each PTV along respective track network sections), detecting and removing obstacles in track network, collision avoidance, monitoring and managing malfunctions and faults in system components, and managing PTV reservations, including user authentication and payments. It is noted that PTV reservations, user authentication and payments may be implemented through various platforms, including but not limited to: a smartphone application, a website, a smartcard, and a dedicated terminal. Central controller 102 may manage the distribution of PTVs along the track network and establishment of driving routes and speeds, by utilizing machine learning tools known in the art (e.g., neural networks, deep learning algorithms, regression models) to identify traffic patterns and PTV driving properties, as well as factoring in historical data (e.g., relating to previous PTV trips) to help optimize the current operation of system 100. Central controller 102 may be distributed among multiple computing devices or components which may reside at a single location or at multiple locations. Information may be conveyed between the components of system 100, such as between central controller 102 and PTVs 120, over any suitable data communication channel or network, using any type of channel or network model and any data transmission protocol (e.g., wired, wireless, radio, WiFi, Bluetooth, and the like).

Track sensors 104 and 106 are each configured to detect relevant information in the vicinity of track network 110, so as to monitor and guide the movement of PTVs 120 and to help prevent collisions or accidents. For example, track sensors 104, 106 may include at least one sensor configured to detect information relating to vehicle movement, such as the position, direction and/or velocity of a moving PTV. Track sensors 104, 106 may further be configured to identify obstructions in or approaching a track section. Track sensors 104, 106 may further include at least one sensor for detecting the level of ambient light, or for detecting weather or climate conditions (e.g., rain, snow, precipitation, fog, strong winds, extreme heat). Track sensors 104, 106 may yet further be configured to ascertain track conditions, such as by detecting faults or malfunctions along track network 110. The information detected by track sensors 104, 106 may be transmitted to central controller 102 for processing, or may be transmitted actively or passively to one or more PTVs 120 (e.g., via vehicle control unit 126) and may be indicated to the vehicle operator. For example, track sensors 104 or 106 may signify that a PTV 120 is approaching or has arrived at a particular type of track network junction, such as: an intersection, an interchange, merging or diverging lanes, a stop or yield line, a traffic light, a roundabout, and the like. Track sensors 104, 106 may generally include one or more sensors operative to detect electromagnetic radiation at any range of wavelengths (e.g., visible or non-visible light, infrared, ultraviolet, radar, microwave, RF), which may be converted into an electronic signal for subsequent processing and/or transmission. For example, track sensor 104 may be embodied by at least one optical sensor, such as an IR sensor or high-resolution camera, operative to capture images in the vicinity of track network 110 over a relatively long distance. Accordingly, track sensor 104 may be positioned at an elevated height, such as mounted on a pole or support structure adjacent to a section of track 111, to facilitate long range imaging. For example, long-range track sensor 104 may be configured to detect obstructions or other potential dangers in the driving path of a PTV 120, as well as the position and velocity of the PTV 120, and to forward the detected information to central controller 102 and/or vehicle control unit 126. Short-range track sensor 106 may be positioned on or adjacent to a track section of track network 110, and may be embodied by a passive detection element, such as a radio-frequency identification (RFID) tag capable of detection by a corresponding RFID reader of a PTV 120 from short ranges (e.g., several meters apart), allowing PTV 120 to directly obtain information from short-range track sensor 106 such as the vehicle position or distance in relation to an approaching track section. Alternatively, track sensor 106 may be an RFID reader configured to detect a corresponding RFID tag of a PTV 120. More generally, detection tags and readers may operate using any suitable form of signal transmission, such as electromagnetic radiation or magnetic forces.

It is noted that the functionality associated with each of the elements of system 100 may be distributed among multiple devices or components or may be performed by other elements of system 100. For example, the functionality described with regard to vehicle control unit 126 or location detection unit 128, may be alternatively or additionally implemented by other sensors or detectors, such as track sensor 104 or track sensor 106.

Figure 4A:
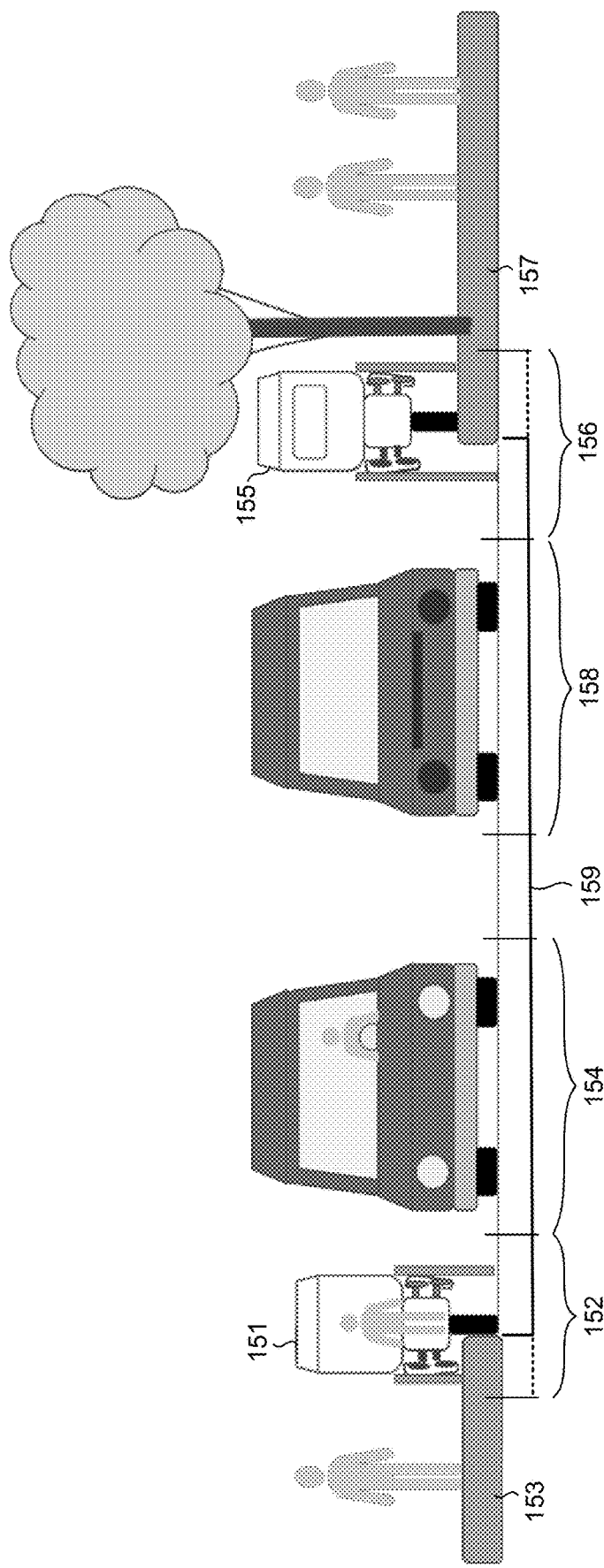
FIG. 4A is a front view schematic illustration of an exemplary personal transportation system deployment in which personal transportation vehicles travel on or partially over public sidewalks, constructed and operative in accordance with an embodiment of the present invention.

The track network of the personal transportation system may be integrated with existing public transport infrastructure in various ways. Reference is made to FIG. 4A, which is a front view schematic illustration of an exemplary personal transportation system deployment in which personal transportation vehicles travel on or partially over public sidewalks, constructed and operative in accordance with an embodiment of the present invention. A first PTV, referenced 151, is driven on a track 152 defined by an edge of a public road 159 adjacent to a curb of a sidewalk 153, and next to a road lane 154 on which a regular vehicle is driving. Track 152 further extends over a small segment of sidewalk 153. In particular, the track engaging elements (e.g., wheels) of PTV 151 is abutting the edge of sidewalk 153 but the PTV main compartment partially extends over a segment of the sidewalk, such that the operation of PTV 151 does not interfere or obstruct with the path of regular vehicles on road lane 154 nor interfere with pedestrians on sidewalk 153. A second PTV, referenced 155, is driven on a separate track 156 defined by a small segment of sidewalk 157 (situated across from sidewalk 153) and extending over a small section of road 159, adjacent to a road lane 158. In particular, the track engaging elements (e.g., wheels) of PTV 155 travel on the curb edge of sidewalk 157, but the main compartment of PTV 155 partially extends over a small segment of road 159 between road lane 158 and sidewalk 157, such that the operation of PTV 155 does not interfere or obstruct with the path of regular vehicles on road lane 158 nor interfere with pedestrians on sidewalk 157.

Figure 4B:
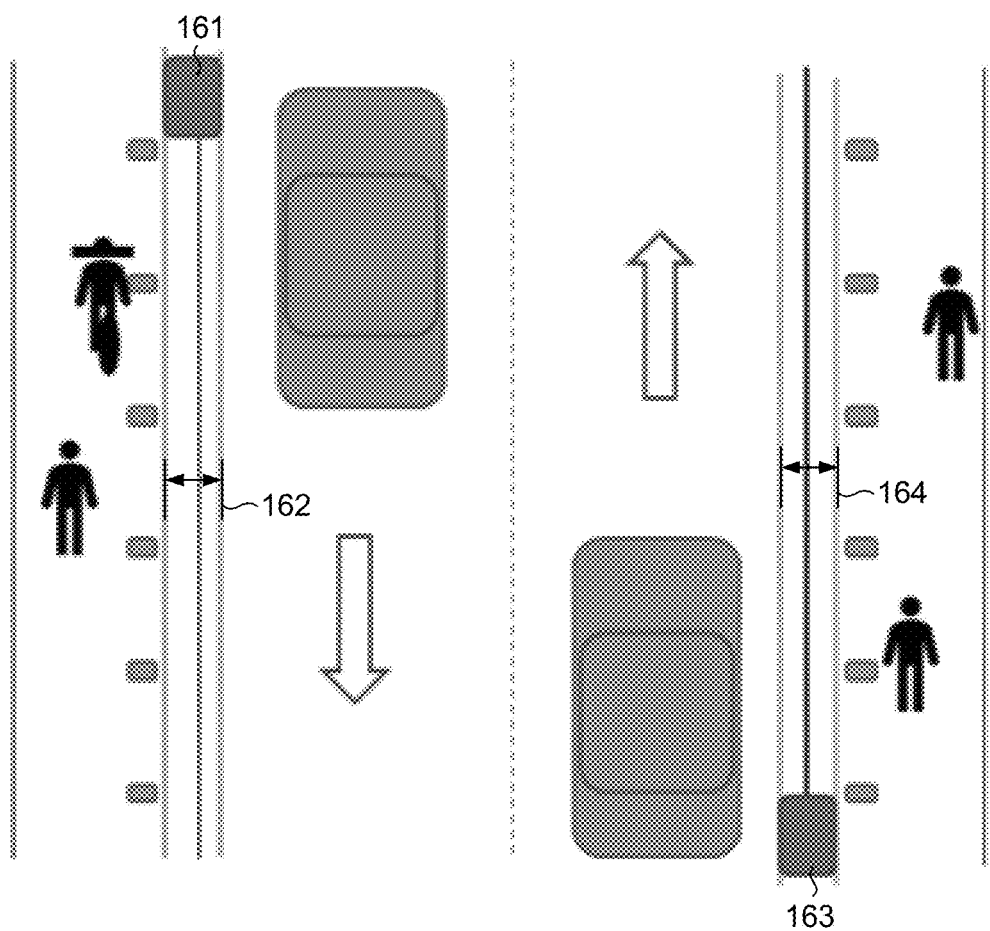
FIG. 4B is a top view schematic illustration of an exemplary personal transportation system deployment with a dedicated track situated between a public road and public sidewalk, constructed and operative in accordance with another embodiment of the present invention.

Alternatively, the tracks may be fully separated from adjacent road lanes and sidewalk paths. Reference is made to FIG. 4B, which is a top view schematic illustration of an exemplary personal transportation system deployment with a dedicated track situated between a public road and public sidewalk, constructed and operative in accordance with another embodiment of the present invention. A first PTV 161 is driven on a first track 162 in one traffic direction, and a second PTV 163 is driven on a second track 164 in an opposite traffic direction. Each track 162, 164 follows a dedicated lane situated between a road lane and an adjacent sidewalk, such that the PTVs 161, 163 are fully enveloped within the respective track 162, 164 without extending over a portion of the road or the sidewalk, and thereby completely avoiding interference with existing road and sidewalk travel. It is appreciated that the allocation of a dedicated PTV track between a road and sidewalk may serve to alleviate road congestion and traffic, by effectively providing an additional transportation lane within a fixed space, thereby increasing transportation capacity.

Figure 4C:
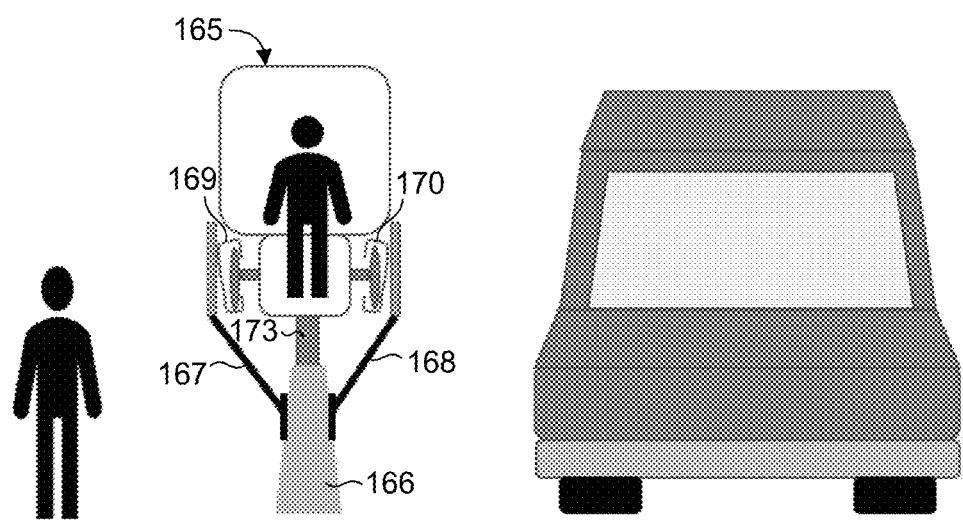
FIG. 4C is a rear upper perspective view schematic illustration of an exemplary personal transportation system deployment in which a personal transportation vehicle travels on a road separation wall, constructed and operative in accordance with an embodiment of the present invention.

Further alternatively, a PTV may be configured to travel directly on a wall or fence or barrier. Reference is made to FIG. 4C, which is a rear upper perspective view schematic illustration of an exemplary personal transportation system deployment in which a personal transportation vehicle travels on a road separation wall, constructed and operative in accordance with an embodiment of the present invention. A PTV, generally referenced 165, is configured to travel on a road separation wall 166 adjoining a public road. For example, road separation wall 166 may be a concrete barrier positioned along a highway (e.g., between guardrails), and may pass over a non-paved terrain surface. Separation wall 166 is configured with a pair of extension members 167, 168 extending laterally outwards and vertically upwards from the upper ledge of separation wall 166. Each extension member 167, 168 is coupled with a respective stabilization rail of PTV 165. In particular, a left extension member 167 extends from a left side of separation wall 166 and is coupled with a left stabilization rail 169. Left stabilization rail 169 is coupled with a left coupling element positioned at an end of a left connector arm of PTV 165. Correspondingly, a right extension member 168 extends from a right side of separation wall 166 and is coupled with a right stabilization rail 170. Right stabilization rail 170 is coupled with a right coupling element positioned at an end of a right connector arm of PTV 165. Thus, extension members 167, 168 support the respective stabilization rails 169, 170 which stabilize PTV 165 as the PTV wheel 173 travels on the top ledge of wall 166. PTV 165 may be designed for carrying freight or cargo, rather than human passengers, in view of safety considerations.

It is appreciated that a track section may be integrated with roads, sidewalks or other existing public transport infrastructure in additional configurations in accordance with other embodiments of the present invention. Moreover, a PTV route may travel through multiple track sections incorporating different types of integrations with public transport infrastructure. For example, a PTV travel route may begin on a dedicated pathway between a road lane and a sidewalk, then transition into travelling over a sidewalk curb, and followed by travel over a road separation wall.

Figure 5:
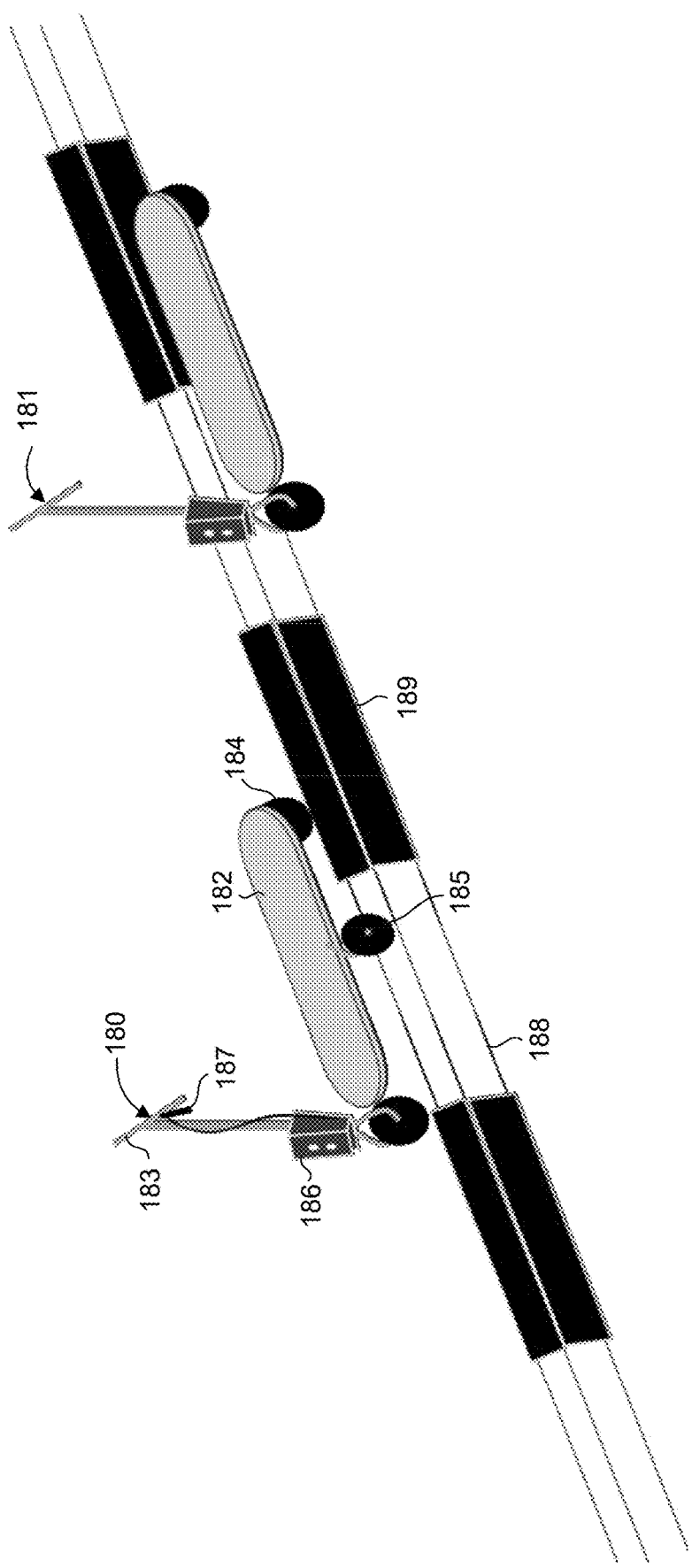
FIG. 5 is a schematic illustration of exemplary two-wheeled personal transportation vehicles traveling along a track section, constructed and operative in accordance with an embodiment of the present invention.

Reference is now made to FIG. 5, which is a schematic illustration of exemplary two-wheeled personal transportation vehicles, referenced 180 and 181, traveling along a track section, constructed and operative in accordance with an embodiment of the present invention. Each PTV 180, 181 is a two-wheeled transporter, resembling a scooter or moped. Alternative two-wheeled vehicle configurations are also possible, such as similar to bicycles. PTV 180 includes a platform 182 for a passenger to stand on, and handlebars 183 for a passenger to hold on to. PTV 180 further includes main driving wheels 184 that engage with a track section 188 defined by a portion of a sidewalk, such that the main driving wheels 184 travel over the sidewalk curb 189 when PTV 180 is operated. PTV 180 further includes a control unit 186, configured to control operations relating to PTV 180 and to provide guidance. Control unit 186 may include at least one detector, such as to detect obstacles or track markers or identify track properties (e.g., similar to control unit 126 of PTV 120). PTV 180 includes an optional user interface 187, which may allow the vehicle operator to control selected driving operations (e.g., initiating drive, braking, acceleration, deceleration, turning, route selection) or to override default or automated controls of driving operation, such as by pressing a button or manipulating an input device disposed on or next to handlebars 183. For example, the user may override default controls in order to allow overtaking another PTV on track section 188, or to initiate an emergency stop of PTV 180. Overriding default controls may be permitted for a specified duration (e.g., a few seconds) or a specified number of times in a given trip. User interface 187 may allow for establishing one or more preset actions when certain conditions are met, such as for example when default controls are overridden for a selected period then the PTV will automatically stop traveling. Control unit 186 may be instructed to ensure that PTV 180 is maintained on the driving route in selected situations, such as only in certain areas, in accordance with the detected location of PTV 180, such as only in track sections having the infrastructure capable of supporting two-wheeled PTVs (such as on main roads).

PTV 180 may optionally include a stabilization mechanism to provide balance and stabilization. For example, the stabilization mechanism may include at least one side wheel 185 disposed on the bottom edge of the platform 182 and extending outwards, where side wheel 185 engages with a side of the track (sidewalk curb 189) and applies a complementary lateral force in accordance with the angular direction of the vehicle. The stabilization mechanism may also include a weight sensor, configured to detect the weight carried by PTV 180, and an angular sensor (e.g., a gyroscope-based sensor), configured to detect the inclination or tilt angle (e.g., in 6 degrees of freedom or 3 rotational axes) of PTV 180. For example, a complementary force may be applied to the side wheels 185 (e.g., through connecting members that connect side wheels 185 to PTV 180) in a selected direction and magnitude, in accordance with the detected weight and inclination angle, so as to maintain PTV 180 in a stable upright position and prevent overturning. The stabilization mechanism may alternatively or additionally include an internal weight, configured to provide a complementary weighting force so as to balance and stabilize PTV 180 as it travels, such as by using an internal electrical or magnetic mechanism to reposition a weight to a selected direction so as to balance and maintain the PTV upright. It is noted that elements of PTV 180, such as side wheel 185, control unit 186, and user interface 187, may be built-in or integrally formed with the PTV, or may be configured for coupling to an existing PTV, via a fixed coupling or a removable coupling (e.g., where PTV elements may be obtained and assembled for a selected duration, such as through a temporary rental).

Figures 6A, 6B:
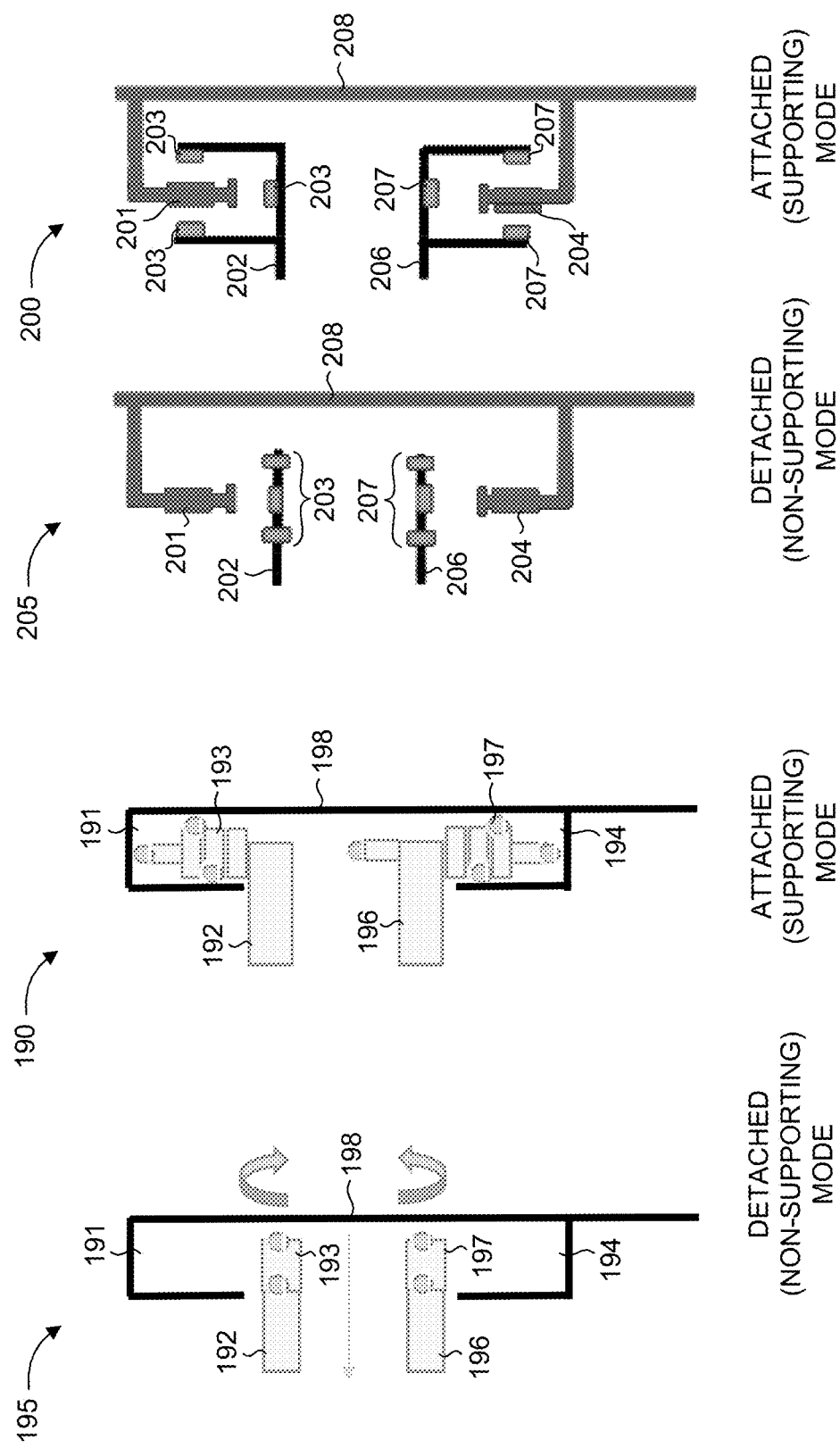
FIG. 6A is a rear sectional view schematic illustration of detachable connecting arms with mechanical coupling, constructed and operative in accordance with an embodiment of the present invention.
FIG. 6B is a rear sectional view schematic illustration of detachable connecting arms with magnetic coupling, constructed and operative in accordance with another embodiment of the present invention.

In accordance with at least some of the embodiments of the present invention, PTV connecting arms may be configured to temporarily detach or decouple from a stabilization rail, so as to facilitate merging and diverging operations. In particular, the PTV may be guided towards a selected direction by detaching the connecting arms from the respective stabilization rail on one side, while keeping the connecting arms on the other side attached to the respective stabilization arm. Reference is now made to FIGS. 6A and 6B. FIG. 6A is a rear sectional view schematic illustration of detachable connecting arms with mechanical coupling, constructed and operative in accordance with an embodiment of the present invention. FIG. 6B is a rear sectional view schematic illustration of detachable connecting arms with magnetic coupling, constructed and operative in accordance with another embodiment of the present invention. A PTV (not shown) includes a plurality of connecting arms, such as at least one connecting arm on the right side and at least one connecting arm on the left side. For example, the PTV may include two connecting arms on each side (i.e., two left connecting arms and two right connecting arms), with one positioned above the PTV center of mass and the other positioned below the PTV center of mass. In another example, the PTV may include four connecting arms on each side (i.e., four left connecting arms and four right connecting arms), with two positioned above the PTV center of mass and two positioned below the PTV center of mass. In the examples provided in FIGS. 6A and 6B, connecting arms 192 and 196 (FIG. 6A), and connecting arms 202 and 206 (FIG. 6B) represent a pair of right connecting arms, with a top right connecting arm (192, 202) disposed above the PTV center of mass, and a bottom right connecting arm (196, 206) disposed below the PTV center of mass.

Referring to FIG. 6A, connecting arms 192, 196 are removably attached to a stabilization rail 198, which may be mounted to a fixed mounting structure (not shown) such as a wall or post affixed to the ground. Each connecting arm 192, 196 includes a respective mechanical coupling element 193, 197, which may be embodied by an array of mechanical bearings. In particular, top right connecting arm 192 includes a top right mechanical coupling element 193, and bottom right connecting arm 196 includes a bottom right mechanical coupling element 197. In a first state or "supporting mode", generally referenced 190, coupling elements 193, 197 are removably attached to right stabilization rail 198, such that connecting arms 192, 196 are rigidly held and prevented from movement. In particular, top right coupling element 193 is detachably engaged from below with an upper portion of right stabilization rail 198, being embedded within a first recess 191 therein, preventing displacement of top right connecting arm 192, while bottom right coupling element 197 is detachably engaged from above with a lower portion of right stabilization rail 198, being embedded within a second recess 194 therein, preventing displacement of right connecting arm 196. In state 190, both connecting arms 192, 196 are rigidly attached to right stabilization rail 198, which compels the PTV to maintain a rightward travel path while being stabilized. In a second state or "non-supporting mode", generally referenced 195, coupling elements 193, 197 are detached or uncoupled from right stabilization rail 198, such that connecting arms 192, 196 have freedom of movement and cease to support or stabilize the PTV. In particular, top right coupling element 193 is detached from recess 191 in the upper portion of stabilization rail 198, allowing for displacement of top right connecting arm 192, while bottom right coupling element 197 is detached from second recess 194 in the lower portion of stabilization rail 198, allowing for displacement of bottom right connecting arm 196. In state 195, both connecting arms are effectively detached from right stabilization rail 198, such that the PTV is no longer compelled to maintain a rightward travel path by right connecting arms 192, 196.

FIG. 6B depicts a configuration analogous to the one shown in FIG. 6A, but for connecting arms with magnetic coupling elements rather than mechanical ones. In particular, a top right connecting arm 202 includes top right magnetic coupling elements 203, configured to magnetically couple with a complementary magnetic element 201 on an upper portion of right stabilization rail 208. A bottom right connecting arm 206 includes bottom right magnetic coupling elements 207 configured to magnetically couple with a complementary magnetic element 204 on a bottom portion of right stabilization rail 208. In a first state or "supporting mode", generally referenced 200, magnetic coupling elements 203, 207 are magnetically coupled to respective magnetic elements 201, 204, e.g., through the application of a magnetic repulsion force from multiple directions to attain a positional equilibrium. As a result, connecting arms 202, 206 are rigidly held and prevented from movement, compelling the PTV to maintain a rightward travel path and avoid overturning. In a second state or "non-supporting mode", generally referenced 205, magnetic coupling elements 203, 207 are detached or uncoupled from respective magnetic elements 201, 204 (e.g., an equilibrant magnetic force is no longer applied), which effectively detaches connecting arms 202, 206 from right stabilization rail 208, such that that the PTV is no longer compelled to maintain a rightward travel path by right connecting arms 202, 206.

When connecting arms on one side of the PTV are detached while connecting arms on the other side remain attached, then the PTV may be guided towards a selected direction, which may facilitate driving operations such as merging and diverging. For example, if the left connecting arm is detached and thus has full freedom of motion, while the right connecting arm remains attached and thus rigidly held and prevented from movement, then the PTV is effectively urged toward the right side. Conversely, if the right connecting arm is detached while the left connecting arm remains attached, then the PTV is effectively urged toward the left side. In this manner, guidance of PTVs at junctions, intersections, or stoppage zones of a track network may be provided, such as to manage merging, diverging, and stopping operations, without utilizing a dedicated track guidance mechanism, such as railroad switches or turnouts.

Figure 7A:
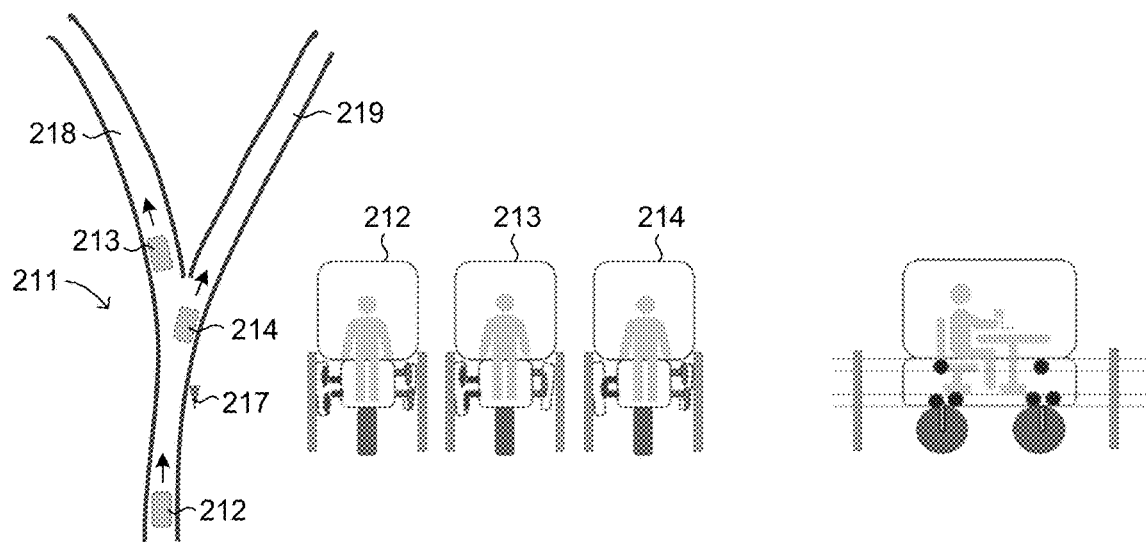
FIG. 7A is a schematic illustration of a track section with a lane diverging intersection, constructed and operative in accordance with an embodiment of the present invention.
Figure 7B:
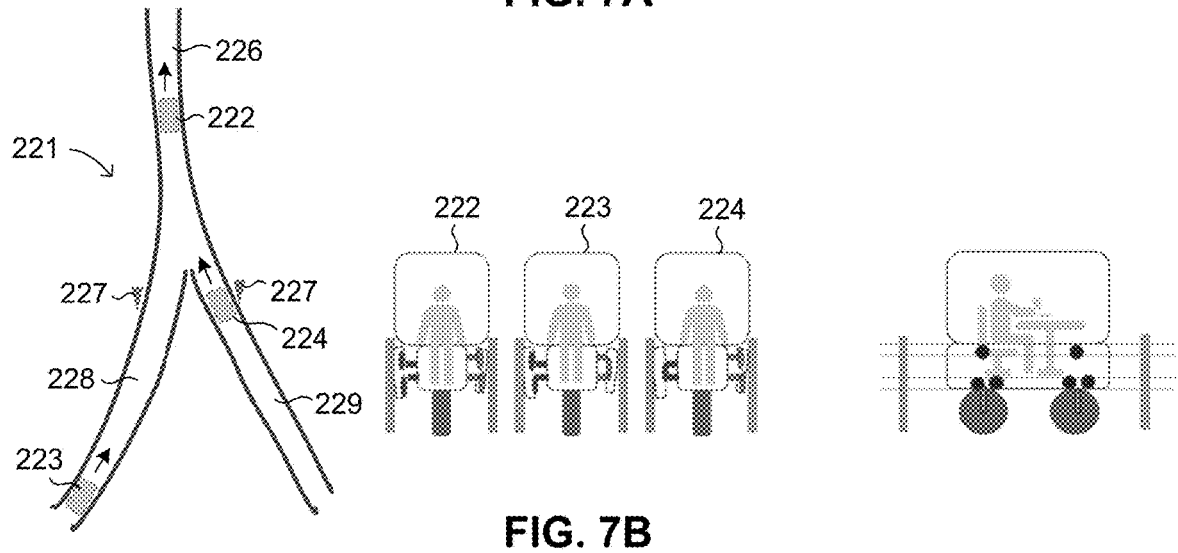
FIG. 7B is a schematic illustration of a track section with a lane merging intersection, constructed and operative in accordance with an embodiment of the present invention.
Figure 7C:
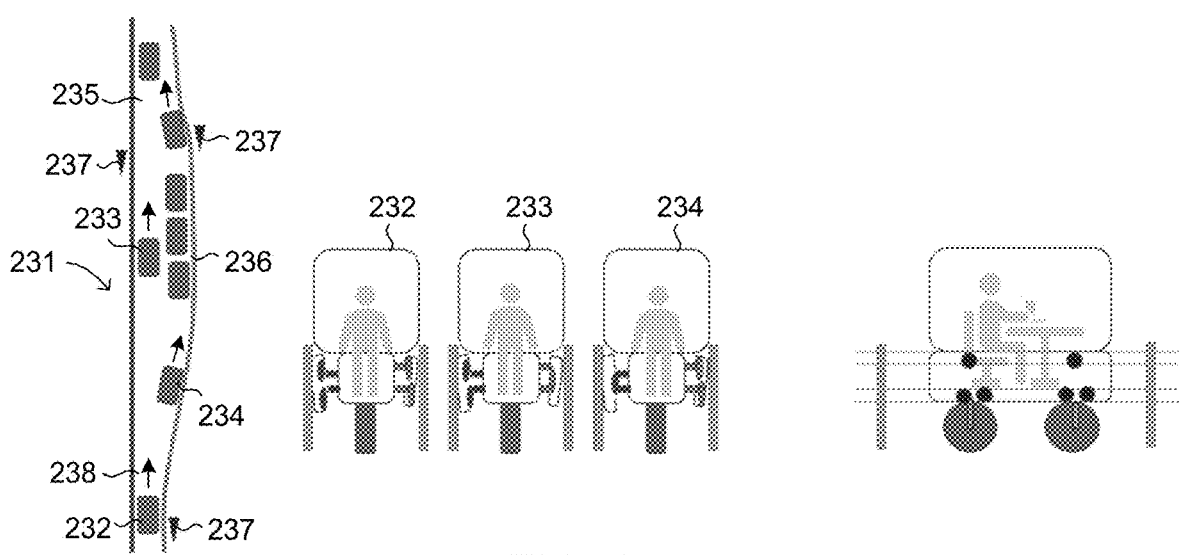
FIG. 7C is a schematic illustration of a track section with a stopping zone, constructed and operative in accordance with an embodiment of the present invention.

Reference is now made to FIGS. 7A, 7B and 7C. FIG. 7A is a schematic illustration of a track section, referenced 211, with a lane diverging junction, constructed and operative in accordance with an embodiment of the present invention. A plurality of PTVs 212, 213, 214 travel along a diverging track section 211. When a PTV reaches the diverging junction, the connecting arm on one side of the PTV may be detached from the respective stabilization rail on that side in order to guide the vehicle toward the opposite side. Each PTV 212, 213, 214 is depicted in a different driving state. In particular, PTV 212 is in a regular driving state in which both left and right connecting arms are attached to the respective left and right stabilization rails, and therefore PTV 212 maintains a substantially straight path. In PTV 213, the connecting arm on the right side is detached (i.e., in a non-supporting mode), while the left connecting arm remains attached (i.e., in a supporting mode), compelling PTV 213 to move toward the left side and effectively guiding PTV 213 to follow the left diverging lane 218. In PTV 214, the right connecting arm remains attached (i.e., in a supporting mode), while the left connecting arm is detached (i.e., in a non-supporting mode), compelling PTV 214 toward the right side and effectively guiding PTV 214 to follow the right diverging lane 219. A diverging lane marker 217 positioned alongside track section 211 provides an indication that a diverging lane junction is approaching and signals the PTV to detach the connecting arms on the applicable side, depending on which direction the vehicle should be guided. In this manner, each vehicle is directed to follow its respective driving route while maintaining traffic flow and avoiding collisions.

A similar protocol can be applied for managing a merging operation, as shown in FIG. 7B, which is a schematic illustration of a track section, generally referenced 221, with a lane merging junction, constructed and operative in accordance with an embodiment of the present invention. When one of the PTVs 222, 223, 224 reaches the merging junction of track section 221, the connecting arm on one side of the PTV may be detached in order to guide the vehicle along the merging junction. PTV 222 is shown with both the left and right connecting arms attached to the respective left and right stabilization rails, and therefore PTV 222 maintains a straight path along post-merge lane 226. PTV 223 enters the merging junction from a left merging lane 228 of track section 221. The right connecting arm of PTV 223 is detached (i.e., in a non-supporting mode), while the left connecting arm of PTV 223 remains attached (i.e., in a supporting mode), maintaining PTV 223 linked to the left stabilization rail and guiding PTV 223 along left merging lane 228. When PTV 223 completes the merge and exits the merging junction, the right connecting arm is reattached to the right stabilization rail to allow PTV 223 to continue straight along post-merged lane 226. PTV 224 enters the merging junction from a right merging lane 229 of track section 221. The right connecting arm of PTV 224 remains attached (i.e., in a supporting mode), while the left connecting arm of PTV 224 is detached (i.e., in a non-supporting mode), maintaining PTV 224 linked to the right stabilization rail and guiding PTV 224 along right merging lane 229. When PTV 224 completes the merge and exits the merging junction, the left connecting arm is reattached to the left stabilization rail to allow PTV 224 to continue straight along post-merge lane 226. A merging lane marker 227 positioned alongside track section 221 provides an indication that a merging junction is approaching and signals the PTV 222, 223, 224 to detach the connecting arms on one side, depending on which direction the vehicle is approaching from.

A similar protocol can also be applied for managing a vehicle stoppage at a designated stopping zone, as shown in FIG. 7C, which is a schematic illustration of a track section, generally referenced 231, with a stopping zone, referenced 236, constructed and operative in accordance with an embodiment of the present invention. Stopping zone 236 may be a designated area for a PTV to stop during the course of a trip, such as to allow passengers to embark or disembark, and/or to allow the loading or unloading of freight or cargo. For example, stopping zone 236 may be part of a transportation terminal or station, which may be situated underground or above ground, and is publicly accessible.

When one of the PTVs 232, 233, 234 reaches the entrance to stopping zone 236 of track section 231, the connecting arm on one side may be detached so as to guide the PTV in a respective direction, such as to enter or exit stopping zone 236. PTV 232 is shown with both the left and right connecting arms attached to the respective left and right stabilization rails, and maintaining a straight path along driving lane 238 of track network 221. In PTV 233, the left connecting arm is attached while the right connecting arm is detached, keeping PTV 233 linked to the left stabilization rail and compelling PTV 233 to bypass stopping zone 236 and follow the path of left stabilization rail towards driving lane 235 (beyond stopping zone 236). In PTV 234, the right connecting arm is attached while the left connecting arm is detached, keeping PTV 234 linked to the right stabilization rail which guides PTV 234 rightwards so as to enter stopping zone 236 from incoming driving lane 238. After PTV 234 completes the stoppage and exits stopping zone 236, the left connecting arm is reattached to the left stabilization rail to allow PTV 234 to continue straight along driving lane 235. A stopping zone lane marker 237 positioned alongside track section 231 provides an indication that a stopping zone is approaching or has ended and signals the PTV 232, 233, 234 to detach or reattach the connecting arms on a respective side if necessary, such as to guide an approaching PTV into the stopping zone or to enable lane merging after exiting the stopping zone.

The detachment of a PTV connecting arm may be implemented manually by a passenger of the PTV (such as via a user control interface), or may be implemented automatically using an automated control mechanism upon detection of a relevant lane marker (217, 227, 237), such as upon detection by an optical scanning device of vehicle controller 126.

It is appreciated that the use of detachable connecting arms for PTV guidance may allow for organized travel of a large quantity of PTVs of different types, by guiding such PTVs in the proper direction along their travel route without requiring a physical mechanism on a track section to control path switching, such as a railroad switch or turnovers. Such a physical mechanism may inherently create large gaps between traveling PTVs which may waste valuable transportation space and limit the number of vehicles and passengers in the track network at a given time. Furthermore, the detachable connecting arms may facilitate driving operations such as merging, diverging, and entering or exiting designated stopping zones, while maintaining stabilization of the PTV by means of the stabilization mechanism (e.g., connecting arms and stabilization rails) to prevent overturning and prevent collisions or accidents (e.g., by preventing the PTV from deviating from the designated travel path and coming into contact with other vehicles or pedestrians).

At least a portion of the PTV stabilization mechanism may be situated at ground level (i.e., below the ground or at a low height above ground), rather than at an elevated height. Ground level stabilization mechanism may be applied at least some of the time and/or in at least some situations, such as to avoid interference with other vehicles or pedestrians. For example, the connecting arms may usually be elevated, such that the PTV center of mass is supported between the connecting arms (e.g., one connecting arm above the center of mass and another connecting arm below), to minimize the danger of overturning even at high speeds or sharp turns. When the PTV reaches a track section involving potential encounters with other vehicles or pedestrians (e.g., at an intersection with a public road or sidewalk, a crosswalk, a public bus stop, or a sidewalk crossing), then the stabilization rails may be transferred to ground level (underground or at a low height above the ground), and the PTV connecting arms may correspondingly shift downwards to follow the ground level stabilization rails, so as not to interfere with the path of the other vehicles or pedestrians.

Reference is made to FIGS. 8A, 8B, 8C, and 8D. FIG. 8A is a side sectional view schematic illustration of a PTV, referenced 250, with detachable connecting arms in a transitional descending stage, constructed and operative in accordance with an embodiment of the present invention. FIG. 8A depicts the transition from a regular elevated state of the connecting arms to a ground level state, in which a front connecting arm 251 on the right side of PTV 250 has already descended but the corresponding rear connecting arm 252 has yet to descend. FIG. 8B is a rear sectional view schematic illustration of a PTV, referenced 253, with mechanically coupled detachable connecting arms descended underground, constructed and operative in accordance with an embodiment of the present invention. PTV 253 includes a left connecting arm assembly 254, and a right connecting arm assembly 255. Both connecting arm assemblies 254, 255 have fully descended and are positioned at ground level, allowing free movement and passage above ground for other vehicles or pedestrians. FIG. 8C is a rear sectional view schematic illustration of a PTV, referenced 256, with magnetically coupled detachable connecting arms descended to ground level, constructed and operative in accordance with an embodiment of the present invention. PTV 256 includes a left connecting arm assembly 257, and a right connecting arm assembly 258. Both connecting arm assemblies 257, 258 have fully descended and are positioned at ground level, allowing free movement and passage above for other vehicles or pedestrians. FIG. 8D is a rear sectional view schematic illustration of the PTV of FIG. 8B with connecting arms positioned on a dedicated stabilization rail above ground, constructed and operative in accordance with an embodiment of the present invention. FIG. 8D depicts PTV 253 with connecting arm assemblies 254, 255 positioned on a dedicated rail or horizontal member, referenced 259, situated at a low height above the ground. This arrangement may somewhat interfere with the passage of other vehicles or pedestrians, but may also avoid the need to excavate underground and associated costs for developing the infrastructure for an underground connecting arm configuration. The connecting arms at ground level may correspond to the connecting arms that connect to elevated height stabilization rails (e.g., arms 192, 196 of FIG. 6A), where the linkage with the descending stabilization rails may compel the connecting arms to correspondingly descend to ground level as well. Alternatively, ground level connecting arms may be separate components different from the connecting arms connecting to elevated height stabilization rails.

In accordance with other embodiments of the present invention, a stabilization mechanism and/or a guidance mechanism may have alternative configurations directed to provide stability and safety of the PTV during turning or merging operations, while being positioned at ground level to allow for free movement of other vehicles and pedestrians. For example, the stabilization mechanism and guidance mechanism may be embodied by at least one connecting arm on either side of the PTV, with a magnetic (or electromagnetic) element disposed on the distal end of each arm and positioned near the ground; a respective array of mechanical bearings underneath each magnetic element configured to roll along the ground in the direction of PTV travel; and a respective rail on the ground along the track on either side of the PTV, the rail composed of a thin strip of ferromagnetic material (e.g., iron). When the PTV travels straight, the bearings are magnetically engaged with the ferromagnetic rails on both sides of the PTV, providing stability and preventing the PTV from overturning or deviating leftwards or rightwards. When the PTV reaches a diverging junction, the ferromagnetic rails continue along one of the diverging lanes, whereas magnetic rails having the same polarity as the magnetic elements are positioned along the second diverging lane (beginning slightly ahead of the diverging junction). For example, ferromagnetic rails are positioned along the left diverging lane following the diverging junction, while magnetic rails of same magnetic polarity as the PTV connecting arm magnetic elements are positioned along the right diverging lane following the diverging junction. If the PTV is required to travel along the left diverging lane, the PTV deploys its connecting arms such that the magnetic elements cause the respective bearings to engage with the left diverging lane ferromagnetic rails, and are repelled from the right diverging lane rails (due to the common polarity), thereby guiding the PTV leftwards. If the PTV is required to travel along the right diverging lane, the PTV may switch the magnetic polarity of the magnetic elements at the end of its connecting arms, or alternatively may deploy different connecting arms having an opposite magnetic polarity, so as to cause the magnetic elements to engage with the right diverging lane rails, thereby guiding the PTV rightwards. A similar protocol may be established for merging junctions. Following the diverging/merging junction, the magnetic rails terminate and continue as ferromagnetic rails along the straight track section. While such an embodiment may provide reduced stabilization and guidance (e.g., as compared to the embodiments described in FIGS. 7A-7C and 8A-8D), it may still provide sufficient stabilization and guidance for PTV travel involving low speeds and non-sharp (wide angle) turns. An alternative embodiment may be based on electromagnetic elements activated according to their distance relative to the ground, such that, for example, when the mechanical bearings are in contact with the ground the resultant pressure precludes current flow so that the electromagnetic elements are not activated, whereas when the bearing are positioned above the ground and not subject to physical pressure the current can flow to activate the electromagnetic elements. Additional mechanisms can be deployed using electrical, magnetic, optical and/or mechanical elements or techniques known in the art, to obtain weight stabilization while minimizing friction with the ground or external surfaces. The particular stabilization mechanism and/or guidance mechanism utilized by a PTV may be adapted to match the particular terrain or road conditions encountered by the PTV during a given travel route.

Figure 9:
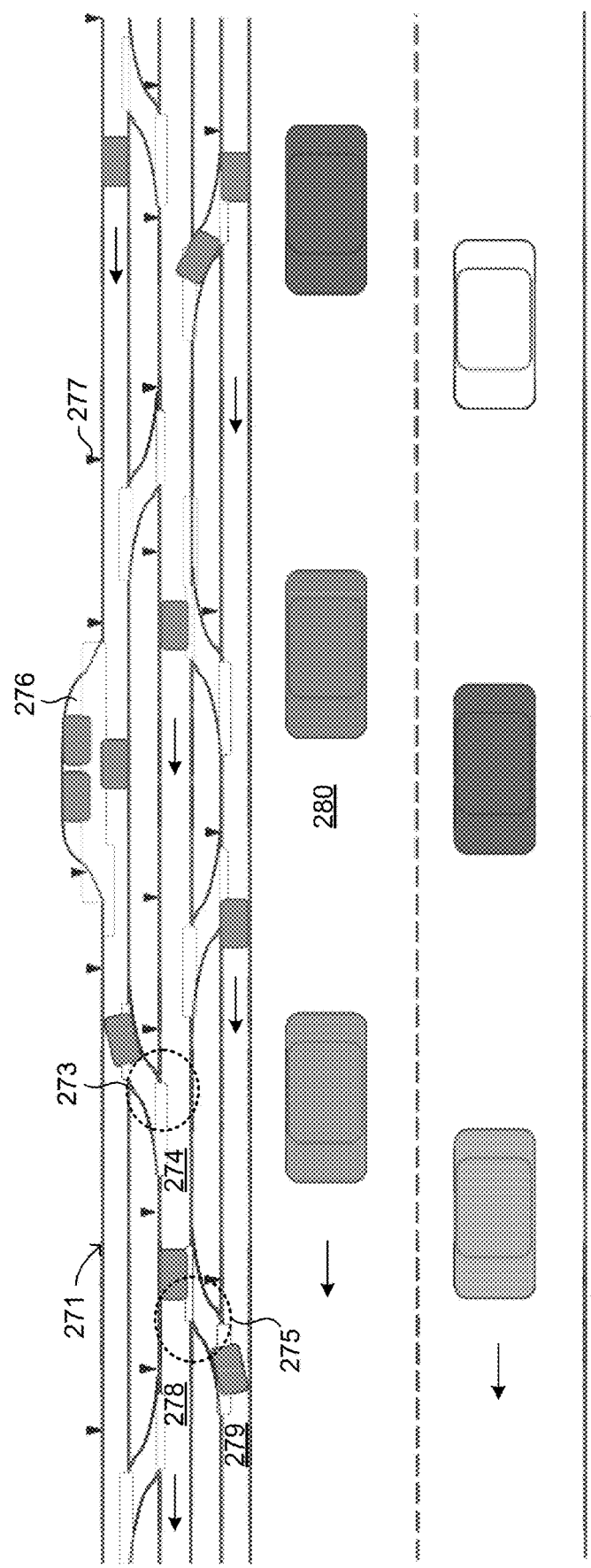
FIG. 9 is a top view schematic illustration of a multilane dedicated track, constructed and operative in accordance with an embodiment of the present invention.

The track network may include a dedicated track section with multiple lanes and with different track junctions and track characteristics. Reference is now made to FIG. 9, which is a top view schematic illustration of a multilane dedicated track, constructed and operative in accordance with an embodiment of the present invention. Track section 271 includes multiple lanes on which PTVs are designed to travel, where the lanes are linked through different junctions. For example, track section 271 incudes a merging junction 273 leading into a post-merge lane 274, and a diverging junction 275, leading into diverging lanes 278 and 279. Track section 271 also includes a stopping zone 276 for designated PTV stoppages. Lane markers 277 are positioned at relevant locations alongside the lanes to indicate an upcoming junction or zone.

According to an aspect of the present invention, a personal transportation system may enable seamless travel with lane changing and merging and diverging operations for a large capacity of PTVs in a multilane and multijunction track network, such as track section 271, while providing effective stabilization to substantially prevent the PTV from overturning. In particular, the guidance and directing of PTVs through different lanes between various track junctions is provided by a guidance mechanism as described hereinabove, such as at least one stabilization rail configured to apply a selective force on a respective side of the PTV via a respective detachable connecting arm and coupling element, when approaching a junction or intersection. The stabilization of PTVs is provided by a stabilization mechanism as described hereinabove, such as at least one stabilization rail configured to apply a selective force on a respective side of the PTV, such as via at least two connecting arms configured to support the PTV on opposing sides of the PTV center of mass (e.g., above and below the center of mass), as depicted in FIGS. 6A and 6B. Accordingly, a multilane and multijunction track network, such as track section 271, may support efficient travel and lane changing operations for a plurality of narrow width PTVs (i.e., where each PTV is characterized by a main section defining a lateral width adapted to contain a single occupant), by providing a guidance mechanism and stabilization mechanism configured to apply complementary forces to support the PTV center of mass, such as above and below, when the PTV is approaching a lane junction. In this manner, the applied forces are substantially horizontal in nature, such that a torque or rotational force that may otherwise cause the PTV to overturn is substantially avoided, even if the PTV is traveling at high speeds or implementing an acute turn, despite the inherent characteristics (e.g., narrow lateral width adapted for a single occupant, and relatively high center of mass) of the PTV.

Track section 271 represents a dedicated track situated next to a public road 280 on which regular vehicles are driven. For example, track section 271 may be allocated from at least a portion of the existing road 280, such as by allocating one of the road lanes (or a portion thereof) to function as a PTV track dedicated for PTV transport. The ability to allocate PTV tracks from within a public road may be a direct result of commuters shifting from regular vehicle transport to PTV transport. The removal of a public road lane (or a portion thereof) may also serve to significantly reduce the overall number of regular vehicles on the public road, thereby alleviating road congestion and other traffic problems, while providing multiple PTV lanes to increase the number of PTVs to maintain a comparable overall transportation capacity. For example, increasing the number of PTVs by a factor of three by providing three PTV lanes in an allocated PTV track section can maintain existing transportation capacity for the same number of commuters within a third of the original area, instead of regular private vehicles. It is noted that such a multi-lane and multi-junction track section may also support PTVs in which the track engaging element (e.g., wheel arrays) are not necessarily narrower in width than the main section, due to minimized constraints of integrating with existing public transit in various locations and terrains.

Moreover, lanes may be selectively allocated in track section 271 in accordance with the needs and requirements of particular PTVs (e.g., a four-wheeled PTV may require multiple lanes or a wider single lane as opposed to a narrower two-wheeled PTV), and/or in accordance with the restrictions arising from a particular location or terrain or timing, which may provide greater flexibility to accommodate different configurations. The allocation of PTV track sections from existing roads or public transport infrastructure (i.e., determining the extent of public road lanes to designate for PTV transport) may also be determined in accordance with local requirements and restrictions (e.g., involving location and/or timing. For example, existing infrastructure may limit a certain track section to only one lane, whereas multiple lanes may be feasible in an adjacent track section. For another example, the number of allocated PTV lanes may be selectively reduced or expanded during a particular time period, such as by increasing the number of PTV lanes during peak traffic hours and then reallocating some of these lanes to regular vehicles or pedestrians during off-peak hours, or by limiting PTV lanes for the duration of a construction project involving nearby road infrastructure, and then expanding the PTV track section to include additional lanes after the construction projection has been completed. If a given PTV track section includes lanes or tracks requiring maneuvering through narrow a width, such as a track situated along a narrow road shoulder or sidewalk curb or a dividing wall, then a PTV may be configured to expand or reduce the lateral width of its track engaging element as needed. For example, if the rightmost lane is adjoining a sidewalk curb (causing a lower obstruction) while the remaining lanes on the left side are unobstructed at the lower portions, the PTV may travel using four wheels (i.e., a pair of wheel arrays distributed under each side of the PTV in a standard 4-wheel vehicle configuration) on the left lanes to enhance stabilization, while transition into a two-wheeled configuration (e.g., by unifying the front pair of wheels into a single unit and the rear pair of wheel into a single unit) when traveling in the rightmost lane, so as to enable maneuvering adjoining the sidewalk curb.

Figure 10:
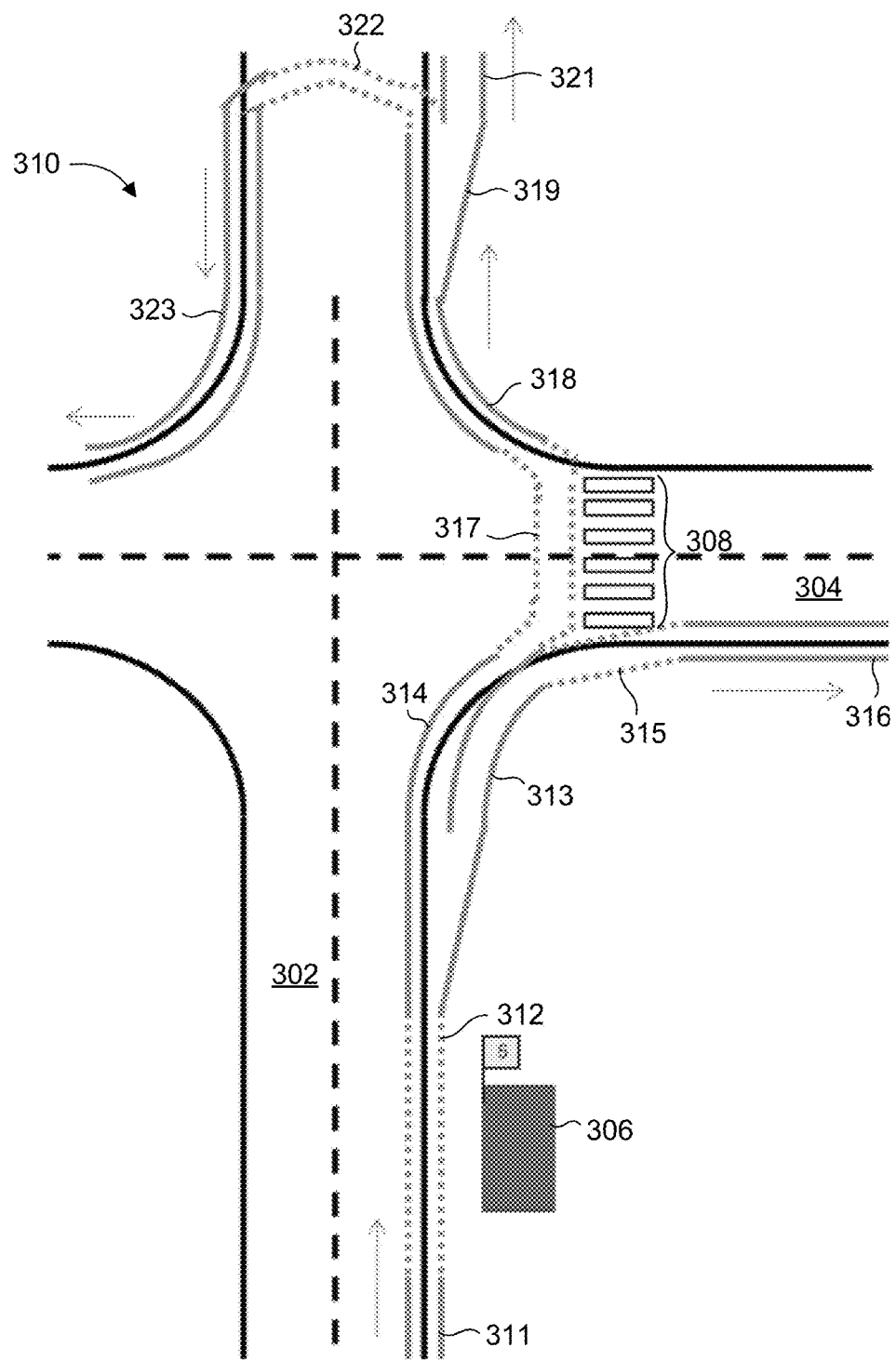
FIG. 10 is a top view schematic illustration of a PTV track network integrated with a public road section and including ground level stabilization rails, constructed and operative in accordance with an embodiment of the present invention.

The personal transportation system may combine elevated and ground level stabilization rails, such as in order to optimally integrate with existing public transport facilities and road layouts. Reference is made to FIG. 10, which is a top view schematic illustration of a PTV track network integrated with a public road section and including ground level stabilization rails, constructed and operative in accordance with an embodiment of the present invention. The PTV track network, generally referenced 310, is integrated with public roads 302 and 304 which intersect one another. PTV track network 310 includes a plurality of elevated rail segments, including track sections 311, 313, 314, 316, 318, 319, 321 and 323 (depicted with a solid gray line), and a plurality of ground level rail segments (i.e., at which the stabilization rails pass below the ground or at a low height above ground), including track sections 312, 315, 317 and 322 (depicted with a dashed gray line). In particular, an elevated rail track section 311 continues into a ground level rail track section 312 (which passes next to a public bus station 312), which then continues into a pair of diverging lanes of track sections 313 and 314. In a ground level rail track section, the PTV main section travels above the ground, but external components coupled to the PTV, such as parts of the stabilization mechanism or the guidance mechanism (e.g., stabilization rails, PTV connecting arms) may descend to a ground level (as shown in FIGS. 8A-8D), so as to avoid interference with other vehicles or pedestrians. If a PTV approaching from track section 312 needs to turn right (i.e., in a direction perpendicular to road 302 and parallel to road 304), then the PTV can continue along track sections 313, 315 and 316. If a PTV approaching from track section 312 needs to continue straight (i.e., in a direction parallel to road 302), then the PTV can continue along track section 314, then through ground level track section 317 (at which the stabilization rails pass underneath road 304 next to an above ground public crosswalk 308), and on through track sections 318, 319 and 321. If a PTV approaching from track section 312 needs to turn left (i.e., in a direction perpendicular to road 302 and parallel to road 304), then the PTV can continue along track sections 314, 317, 318 and 319, then continue on through track sections 322 and 323. Accordingly, a right turn can be implemented before the public road intersection, while a left turn is implemented after the intersection and requires additional travel. Nevertheless, the configuration of track network 310 provides route flexibility, without having to allocate PTV pathways from the driving lanes of roads 302, 304, by incorporating different track types, track shapes, and lane junctions (e.g., merging and diverging lanes), while minimizing disruption of existing public transport infrastructure by regular vehicles and pedestrians.

Figure 11:
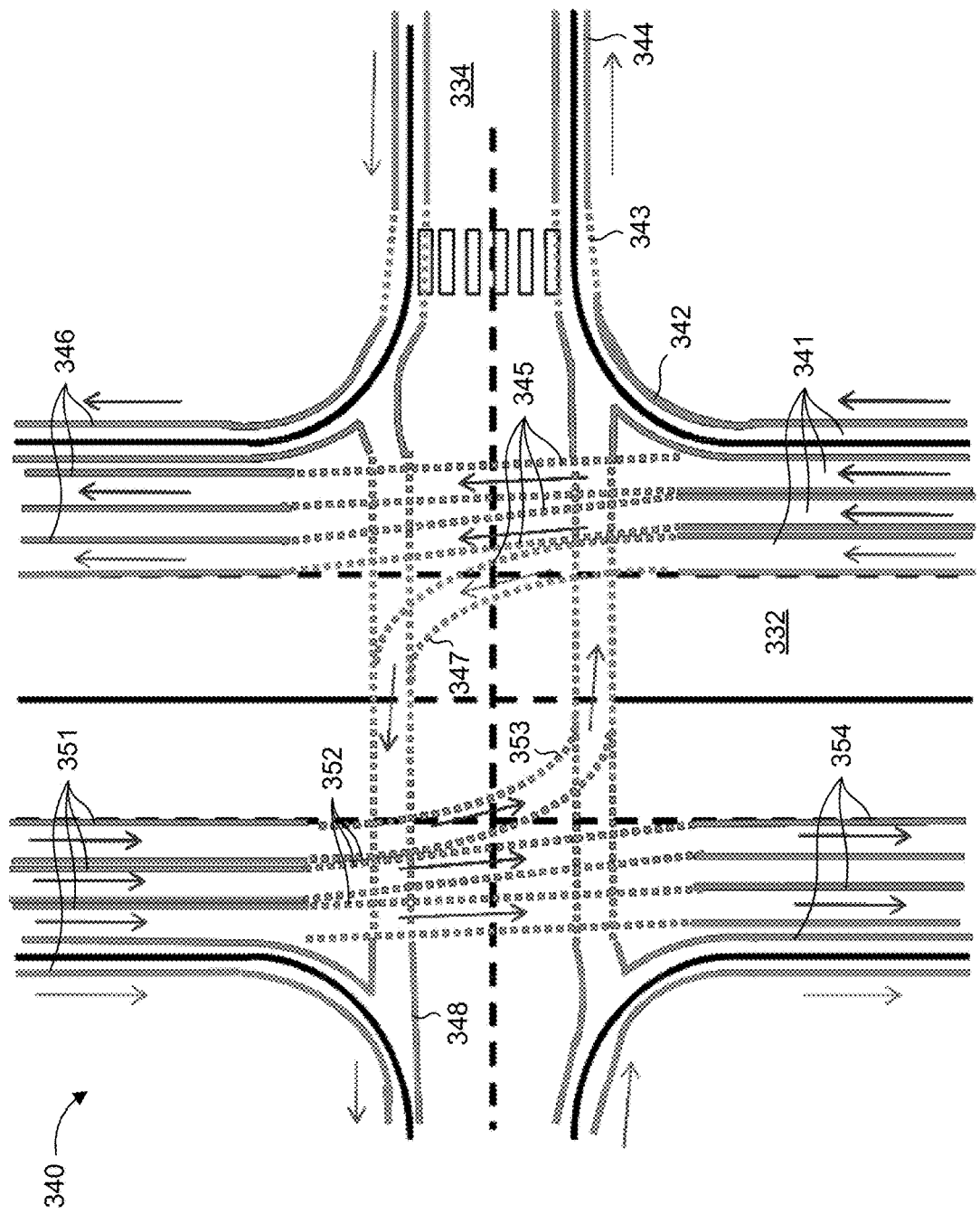
FIG. 11 is a top view schematic illustration of a PTV track network including ground level stabilization rails, the track network integrated with a public road section where multiple PTV lanes are allocated from a regular vehicle lane, constructed and operative in accordance with another embodiment of the present invention.

Reference is made to FIG. 11, which is a top view schematic illustration of a PTV track section including ground level stabilization rails, the track network integrated with a public road section where multiple PTV lanes are allocated from a regular vehicle lane, constructed and operative in accordance with another embodiment of the present invention. The PTV track network, generally referenced 340, is integrated with public roads 332 and 334 which intersect one another. PTV track network 340 includes track sections allocated from a driving lane of road 332, such as track sections 341, 345, 346, 351 and 352, each of which includes multiple PTV lanes. PTV track network 340 includes a plurality of elevated rail segments, including track sections 341, 342, 344, 346, 348, 351 and 354 (depicted with a solid gray line), and a plurality of ground level rail segments (i.e., at which the stabilization rails pass below the ground or at a low height above ground), including track sections 343, 345, 347, 352 and 353 (depicted with a dashed gray line). If a PTV approaching from track section 341 (i.e., traveling "northbound") needs to turn right, then the PTV can continue along track sections 342, 343 and 344. If a PTV approaching from track section 341 needs to continue straight, then the PTV can continue along track sections 345 and 346. If a PTV approaching from track section 341 needs to turn left, then the PTV can travel along the leftmost diverging lane of track section 345, then continue through track sections 347 and 348. A similar arrangement provides route flexibility for PTVs travelling from the opposite direction. For example, if a PTV approaching from track section 351 (i.e., traveling "southbound") needs to continue straight, the PTV can continue through track sections 352 and 354, whereas if a PTV approaching from track section 351 needs to turn left, then the PTV can travel along the leftmost diverging lane of track section 352, then continue through track sections 353, 343 and 344. Thus, the configuration of track network 340 provides route flexibility, with multiple PTV pathways integrated in and around a public road intersection, incorporating multiple lanes in different directions, while minimizing disruption of existing public transport infrastructure by regular vehicles and pedestrians.

A plurality of PTVs may be linked together to form a series of interconnected vehicles configured to travel together on the track network, similar to a train. The linkage between PTVs can be done through suitable connection mechanisms and techniques known in the art that provide sufficient connection strength and flexibility to allow a minimal travel speed to be maintained, and without significantly limiting the number of vehicles in the series. For example, a PTV may be composed of a front section and a rear section, each of which can open up and form a removable linkage with the front section or rear section of another PTV. For example, a PTV rear section may be configured similar to an articulated vehicle, such as an articulated bus, with bendable side walls and upper and lower connection joints. When a user submits a PTV reservation for a double occupancy, two individual PTVs can interconnect, such as a linkable rear section of a first PTV linking with a linkable front section of a second PTV, to accommodate the two passengers. The linked PTVs may arrive already connected at the designated pickup location, and then subsequently disconnect at the destination location upon completion of the journey. In another exemplary configuration of a connectable PTV, a seat or standing platform in a PTV main section may be folded or repositioned to allow two passengers to sit or stand facing one another. A plurality of PTV sections may be linked in a similar manner.

According to an aspect of the present invention, one or more PTVs may be temporarily incorporated into or within a different PTV for a mutual journey. For example, at least one "local transit" PTV designed for short distance travel (e.g., local transit within cities) may be incorporated into a larger-sized "regional transit" PTV designed for longer-distance travel (e.g., intercity transit). The local transit PTV (e.g., a short length single occupant vehicle, such as a two-wheeled PTV) may be housed within the main section of the regional transit PTV (e.g., a larger sized multi-occupant PTV, such as a truck or bus with a capacity to contain a plurality of single occupant PTVs, such as up to thirty). In this manner, the local transit PTV occupants can be transported to a long-distance destination via the regional transit PTV, which may be autonomous (self-driving) or manually operated by a user.

The PTV tracks may include notches or drainage openings to allow for proper drainage. In general, a track section or other personal transportation system component in contact with the ground may be configured with drainage openings and/or otherwise be integrated with an underground drainage treatment system, so as not to interfere with drainage operations.

A PTV may include additional components to facilitate travel. For example, a PTV may include a tool adapted to clear debris and remove or displace obstructions on a track along the PTV travel route. The tool may include a blade or scraper positioned at the front of the PTV main section and configured to collect and push aside relatively small obstructions in the pathway of a PTV. The obstruction clearance tool may be controlled manually by a PTV passenger or by a remote operator. For another example, a PTV may include a tool adapted to clear or melt snow or ice on a track section or stabilization rail, such as by pushing aside snow/ice or by dispersing substances such as salt, to enable PCT travel in snowy or icy weather conditions.

A PTV may further include an image sensor or camera configured to capture images of the vehicle interior, such as images depicting the passenger and/or freight being carried. The captured images may be transmitted to a remote location, such as to a user associated with the PTV reservation (e.g., a parent of a child traveling in the PTV) or a system control operator, and may be utilized for security purposes (e.g., to ensure the safety, security or integrity of the passenger and/or freight). A PTV or a track section may further include at least one sensor or indicator configured to detect or indicate proper PTV linkages (e.g., for linked or interconnected PTVs), or maintenance requirements. A PTV inspection station located along PTV track network may provide selected inspection services, such as an assessment of PTV elements and components, to verify proper functioning and to perform repairs or replacements if necessary.

According to an aspect of the present invention, there is provided a computer-implemented application executable on a computing device in communication with a computer network, such as a smartphone application, to enable a user to reserve a personal transportation vehicle. The user may use the application to order a PTV for a designated time and location, depending on current availability and requirements, and pending an initial authentication and approval process of the user. The application may also incorporate various features, such as user preferences and history, common travel routes or destinations, and the like. A PTV reservation may also be implemented at a dedicated PTV order station, which may be dispersed at different locations, such as in the vicinity of a PTV track network.

According to another aspect of the present invention, the PTVs may be utilized to facilitate delivery of cargo to a destination without requiring a user present in the PTV. For example, there may be at least one local assistant, who may be embodied by a person or by a robot machine, who is present at the delivery location to retrieve the cargo from the PTV, and to deliver it to the endpoint destination (e.g., similar to an autonomous delivery drone), eliminating the need for a passenger in each PTV to accompany the cargo during its transport.

According to a further aspect of the present invention, cargo transported by a PTV may be secured by a security mechanism, and which may be applied by a first designated user (e.g., a sender of the cargo) at a journey starting location. The security mechanism may be subsequently released by a second designated user (e.g., a receiver of the cargo) at a journey destination, by means of a security release procedure, such as a numerical code or other authentication process. The security mechanism and/or security release procedure may be applied remotely, such as via a computer-implemented application executable on a computing device belonging to the cargo sender or cargo receiver.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A personal transportation system comprising:
 a plurality of personal transportation vehicles, each personal transportation vehicle (PTV) comprising:
  a main section, defining a lateral width adapted to contain a single occupant; and
  a driving mechanism, configured to propel the PTV, the driving mechanism comprising at least one track engaging element, protruding downwards from the main section and defining a lateral width narrower than the lateral width of the main section such that the main section is prone to fall over when the PTV is at rest, whereby the space between the lateral width of the main section and the lateral width of the track engaging element can be occupied by public infrastructure;
 a track network, comprising a series of track sections on which the plurality of PTVs is driven, each track section comprising:
  a ground portion, defining a lateral width minimally adapted to accommodate the lateral width of the track engaging element; and
  an empty space above the ground portion, the empty space being free of non-transient obstacles, the empty space defining a lateral width adapted to minimally accommodate the lateral width of the main section;
 a guidance mechanism, configured to guide the PTV when traveling along the track network and to prevent the PTV from deviating from the track sections, using at least one of:
  at least one external rail, configured to engage with a coupling element of the PTV and to maintain the PTV on a current track section; and
  an internal guidance control system, configured to detect boundaries or a centerline of a current track section and control steering of the PTV to maintain the PTV within the detected boundaries or aligned with the detected centerline; and
 a stabilization mechanism, configured to stabilize the PTV when traveling along the track network and to prevent the PTV from falling over when turning or merging or diverging.

2. The personal transportation system of claim 1, wherein the stabilization mechanism comprises at least one of:
- at least one connector arm comprising a coupling element, engageable with a stabilization rail fixedly mounted along a track section of the track network;
- at least one stabilization rail, fixedly mounted along a track section of the track network and configured to engage with a portion of the PTV;
- at least one side wheel, extending below the main section and configured to engage with and apply a complementary lateral force to a track section;
- at least one weight sensor, configured to detect the weight carried by the PTV;
- at least one angular sensor, configured to detect the inclination of the PTV; and
- an internal weight, disposed within the PTV and configured to provide a counterforce to stabilize the PTV during PTV motion.

3. The personal transportation system of claim 2, wherein at least a portion of the stabilization rail is located at ground level below ground or at a low height above ground, and wherein a track section comprises a track integrated with at least a portion of public transit infrastructure.

4. The personal transportation system of claim 2, wherein the connector arm is a detachable connector arm, to enable detachment of at least one detachable connector arm on a selected side of the PTV to guide the PTV in a selected direction of the track network.

5. The personal transportation system of claim 2, wherein the main section comprises: a wide upper portion, adapted to accommodate the upper body of a passenger; and a narrow lower portion, adapted to accommodate the lower body of the passenger, wherein the stabilization rail is configured to engage with the narrow lower portion of the main section, such that the lateral width of the narrow lower portion together with the stabilization rail does not exceed the lateral width of the upper wider portion of the main section.

6. The personal transportation system of claim 1, wherein a track section comprises a track adjacent to a road or sidewalk, such that at least a portion of the main section of the PTV extends over the road or sidewalk when traveling over the track.

7. The personal transportation system of claim 1, wherein the PTV is configured to selectively expand or reduce the lateral width of a track engaging element thereof, to conform to width requirements of a track section.

8. A method for personal transportation, the method comprising the procedures of:
- providing a plurality of personal transportation vehicles, each personal transportation vehicle (PTV) comprising:
- a main section, defining a lateral width adapted to contain a single occupant; and
- a driving mechanism, configured to propel the PTV, the driving mechanism comprising at least one track engaging element, protruding downwards from the main section and defining a lateral width narrower than the lateral width of the main section such that the main section is prone to fall over when the PTV is at rest, whereby the space between the lateral width of the main section and the lateral width of the track engaging element can be occupied by public infrastructure;
- providing a track network, comprising a series of tracks on which the plurality of PTVs is driven, each track comprising:
- a ground portion, defining a lateral width minimally adapted to accommodate the lateral width of the track engaging element; and
- an empty space above the ground portion, the empty space being free of non-transient obstacles, the empty space defining a lateral width adapted to minimally accommodate the lateral width of the main section; and
- guiding the PTV when traveling along the track network and preventing the PTV from deviation from the track sections, using a guidance mechanism that uses at least one of:
- at least one external rail, configured to engage with a coupling element of the PTV and to maintain the PTV on a current track section; and
- an internal guidance control system, configured to detect boundaries or a centerline of a current track section and control steering of the PTV to maintain the PTV within the detected boundaries or aligned with the detected centerline; and
- stabilizing the PTV when traveling along the track network and preventing the PTV from falling over when turning or merging or diverging, using a stabilization mechanism.

9. The method of claim 8, wherein the connector arm is a detachable connector arm, to enable detachment of at least one detachable connector arm on a selected side of PTV to guide the PTV in a selected direction of the track network.

10. The method of claim 8, wherein a track section comprises a track adjacent to a road or sidewalk, such that at least a portion of the main section of the PTV extends over the road or sidewalk when traveling over the track.

11. The method of claim 8, further comprising the procedure of guiding a PTV through at least one of:
- a diverging junction, by detaching a connecting arm on one side of the PTV from a respective side stabilization rail, when approaching the diverging junction, so as to guide the PTV toward the opposite side by maintaining the PTV linked only to the stabilization rail on the opposite side; and
- a merging junction, by detaching a connecting arm on one side of the PTV from a respective side stabilization rail, when approaching the merging junction from the opposite side, so as to maintain the PTV linked to the stabilization rail on the opposite side until completion of merging.

12. The method of claim 8, wherein the main section comprises: a wide upper portion, adapted to accommodate the upper body of a passenger; and a narrow lower portion, adapted to accommodate the lower body of the passenger, wherein the stabilization rail is configured to engage with the narrow lower portion of the main section, such that the lateral width of the narrow lower portion together with the stabilization rail does not exceed the lateral width of the upper wider portion of the main section.

13. A personal transportation system comprising:
- a plurality of personal transportation vehicles, each personal transportation vehicle (PTV) comprising: a driving mechanism, and a main section defining a lateral width adapted to contain a single occupant;
- a track network, comprising a series of track sections on which the plurality of PTVs is driven, the track network including multiple lanes and intersections and junctions, the track network suitable for integration with existing public transit infrastructure such that at least one public road or sidewalk passes through at least one of the track sections;
- a stabilization mechanism, configured to stabilize the PTV when traveling along the track network and to prevent the PTV from falling over when turning or merging or diverging, the stabilization mechanism comprising at least one stabilization rail mounted along a track section of the track network and configured to engage with a portion of the PTV; and a guidance mechanism, configured to guide the PTV through the intersections and the junctions and between the multiple lanes and prevent the PTV from deviating from the track sections, the guidance mechanism comprising:

at least one stabilization rail, comprising at least one of:
i) at least one rail on a ground along the track sections on at least one side of the PTV, allowing for free movement of other vehicles and pedestrians; and
ii) ground level rail segments and elevated rail segments, configured to guide the PTV at ground level along a track section passing through a public road or sidewalk while enabling above ground passage for vehicles and pedestrians; and connecting arms, each comprising a coupling element, configured to detachably engage with the stabilization rail, for applying a selected force on a respective side of the PTV when approaching a junction or intersection to maintain the PTV on a designated track section.

14. The personal transportation system of claim 13, wherein the coupling element comprises at least one magnetic/electromagnetic coupling element, disposed on the distal end of each connector arm, the magnetic/electromagnetic coupling element configured to change the magnetic polarity thereof, wherein the guidance mechanism further comprises at least one array of mechanical bearings, disposed underneath each magnetic/electromagnetic coupling element, configured to roll along the ground in the direction of PTV travel, wherein the at least one stabilization rail comprises a stabilization rail on the ground along a track section on at least one side of the PTV, the rail comprising a strip of ferromagnetic material, wherein when the PTV travels straight, the bearings are magnetically engaged with the stabilization rails, providing stability and preventing the PTV from falling over or deviating from the designated track section, and wherein when the PTV reaches a merging or diverging junction, at least one of the magnetic elements is directed to selectively switch the magnetic polarity thereof, to engage with a selected stabilization rail of opposite magnetic polarity and to guide the PTV toward a selected direction.

15. The personal transportation system of claim 13, wherein the at least one stabilization rail comprises:

a left stabilization rail disposed along a track section on a left side of the PTV; and a right stabilization rail disposed along a track section on a right side of the PTV, wherein the connecting arms comprises:

at least one top left connecting arm, extending from the left side of the PTV, the top left connecting arm comprising at least one top left coupling element, configured to detachably engage from below with an upper portion of the left stabilization rail;

at least one bottom left connecting arm, extending from the left side of the PTV, the bottom left connecting arm comprising at least one bottom left coupling element, configured to detachably engage from above with a lower portion of the left stabilization rail;

at least one top right connecting arm, extending from the right side of the PTV, the top right connecting arm comprising at least one top right coupling element, configured to detachably engage from below with an upper portion of the right stabilization rail; and at least one bottom right connecting arm, extending from the right side of the PTV, the bottom right connecting arm comprising at least one bottom right coupling element, configured to detachably engage from above with a lower portion of the right stabilization rail, wherein when the PTV travels straight, each of the left side and the right side of the PTV is in a supporting mode, such that each of the top left coupling element and the bottom left coupling element is coupled to the left stabilization rail, and each of the top right coupling element and the bottom right coupling element is coupled to the right stabilization rail, providing stability and preventing the PTV from falling over or deviating leftwards or rightwards from the designated track section, wherein when the PTV reaches a merging or diverging junction, a respective side of the PTV enters a non-supporting mode to guide the PTV toward a selected direction, the non-supporting mode selected from the group consisting of:

a left side non-supporting mode, wherein each of the top left coupling element and the bottom left coupling element is detached from the left stabilization rail, while each of the top right coupling element and the bottom right coupling element remains coupled to the right stabilization rail, so as to guide the PTV rightwards; and a right side non-supporting mode, wherein each of the top right coupling element and the bottom right coupling element is detached from the right stabilization rail, while each of the top left coupling element and the bottom left coupling element remains coupled to the left stabilization rail, so as to guide the PTV leftwards.

16. A method for personal transportation, the method comprising the procedures of:

providing a plurality of personal transportation vehicles, each personal transportation vehicle (PTV) comprising: a driving mechanism; and a main section defining a lateral width adapted to contain a single occupant;

providing a track network, comprising a series of track sections on which the plurality of PTVs is driven, the track network including multiple lanes and intersections and junctions, the track network suitable for integration with existing public transit infrastructure such that at least one public road or sidewalk passes through at least one of the track sections;

stabilizing the PTV when traveling along the track network and preventing the PTV from falling over when turning or merging or diverging, using a stabilization mechanism comprising at least one stabilization rail mounted along a track section of the track network and configured to engage with a portion of the PTV; and guiding the PTV through the intersections and the junctions and between the multiple lanes, and preventing the PTV from deviating from the track sections, using a guidance mechanism comprising:

at least one stabilization rail, comprising at least one of:
i) at least one rail on a ground along the track sections on at least one side of the PTV, allowing for free movement of other vehicles and pedestrians; and
ii) ground level rail segments and elevated rail segments, configured to guide the PTV at ground level along a track section passing through a public road or sidewalk while enabling above ground passage for vehicles and pedestrians; and connecting arms, each comprising a coupling element, configured to detachably engage with the stabilization rail, for applying a selected force on a respective side of the PTV when approaching a junction or intersection to maintain the PTV on a designated track section.

17. The method of claim 16,
wherein the coupling element comprises at least one magnetic/electromagnetic coupling element, disposed on the distal end of each connector arm, said magnetic/electromagnetic coupling element configured to change the magnetic polarity thereof, wherein the guidance mechanism further comprises at least one array of mechanical bearings, disposed underneath each magnetic/electromagnetic coupling element, configured to roll along the ground in the direction of PTV travel, wherein the at least one stabilization rail comprises a stabilization rail on the ground along a track section on at least one side of the PTV, the rail comprising a strip of ferromagnetic material, wherein when the PTV travels straight, the bearings are magnetically engaged with the stabilization rails, providing stability and preventing the PTV from falling over or deviating from the designated track section, and wherein when the PTV reaches a merging or diverging junction, at least one of the magnetic elements is directed to selectively switch the magnetic polarity thereof, to engage with a selected stabilization rail of opposite magnetic polarity and to guide the PTV toward a selected direction.

18. The method of claim 16, wherein the at least one stabilization rail comprises:
a left stabilization rail disposed along a track section on a left side of the PTV; and
a right stabilization rail disposed along a track section on a right side of the PTV,
wherein the connecting arms comprises:
at least one top left connecting arm, extending from the left side of the PTV, the top left connecting arm comprising at least one top left coupling element, configured to detachably engage from below with an upper portion of the left stabilization rail;

at least one bottom left connecting arm, extending from the left side of the PTV, the bottom left connecting arm comprising at least one bottom left coupling element, configured to detachably engage from above with a lower portion of the left stabilization rail;

at least one top right connecting arm, extending from the right side of the PTV, the top right connecting arm comprising at least one top right coupling element, configured to detachably engage from below with an upper portion of the right stabilization rail; and at least one bottom right connecting arm, extending from the right side of the PTV, the bottom right connecting arm comprising at least one bottom right coupling element, configured to detachably engage from above with a lower portion of the right stabilization rail, wherein when the PTV travels straight, each of the left side and the right side of the PTV is in a supporting mode, such that each of the top left coupling element and the bottom left coupling element is coupled to the left stabilization rail, and each of the top right coupling element and the bottom right coupling element is coupled to the right stabilization rail, providing stability and preventing the PTV from falling over or deviating leftwards or rightwards from the designated track section, and when the PTV reaches a merging or diverging junction, a respective side of the PTV enters a non-supporting mode to guide the PTV toward a selected direction, the non-supporting mode selected from the group consisting of:

comprising at least one of: i) at least one rail on a ground along the track sections on at least one side of the PTV, allowing for free movement of other vehicles and pedestrians; and ii) ground level rail segments and elevated rail segments, configured to guide the PTV at ground level along a track section passing through a public road or sidewalk while enabling above ground passage for vehicles and pedestrians; and connecting arms, each comprising a coupling element, configured to detachably engage with the stabilization rail, for applying a selected force on a respective side of the PTV when approaching a junction or intersection to maintain the PTV on a designated track section.

* * * * *